(12) United States Patent
Raveendran et al.

(10) Patent No.: US 9,131,279 B2
(45) Date of Patent: Sep. 8, 2015

(54) PREPARING VIDEO DATA IN ACCORDANCE WITH A WIRELESS DISPLAY PROTOCOL

(75) Inventors: Vijayalakshmi R. Raveendran, San Diego, CA (US); Judit Martinez Bauza, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 932 days.

(21) Appl. No.: 12/779,661

(22) Filed: May 13, 2010

(65) Prior Publication Data

US 2011/0032334 A1 Feb. 10, 2011

Related U.S. Application Data

(60) Provisional application No. 61/231,921, filed on Aug. 6, 2009.

(51) Int. Cl.
*H04N 13/02* (2006.01)
*H04N 21/6437* (2011.01)
(Continued)

(52) U.S. Cl.
CPC ....... *H04N 21/6437* (2013.01); *H04N 13/0003* (2013.01); *H04N 13/0029* (2013.01); *H04N 21/2381* (2013.01); *H04N 21/4122* (2013.01); *H04N 21/41407* (2013.01); *H04N 21/4363* (2013.01); *H04N 21/4381* (2013.01); *H04N 21/43615* (2013.01); *H04N 21/43637* (2013.01); *H04N 21/440218* (2013.01); *H04N 21/44231* (2013.01)

(58) Field of Classification Search
USPC .................. 348/42, 43, 46, 51, 739, E13.001, 348/E13.074, E13.075, E13.003, E13.02, 348/E13.027; 345/419
See application file for complete search history.

(56) References Cited

U.S. PATENT DOCUMENTS 6,314,211 B1 11/2001 Kim et al.
6,590,513 B2 7/2003 Stetson et al.
(Continued)

FOREIGN PATENT DOCUMENTS

CN 101166270 A 4/2008
CN 101197770 A 6/2008
(Continued)

OTHER PUBLICATIONS

Akar, G. et al. ("Transport Methods in 3DTV—A Survey"; IEEE Transactions on Circuits and Systems for Video Technology; vol. 17, No. 11; Nov. 2007; pp. 1622-1630).*
(Continued)

*Primary Examiner* — Behrooz Senfi
*Assistant Examiner* — Maria Vazquez Colon

(57) ABSTRACT

In general, techniques are described for preparing video data in accordance with a wireless display protocol. For example, a portable device comprising a module to store video data, a wireless display host module and a wireless interface may implement the techniques of this disclosure. The wireless display host module determines one or more display parameters of a three-dimensional (3D) display device external from the portable device and prepares the video data to generate 3D video data based on the determined display parameters. The wireless interface then wirelessly transmits the 3D video data to the external 3D display device. In this way, a portable device implements the techniques to prepare video data in accordance with a wireless display protocol.

37 Claims, 15 Drawing Sheets

(51) Int. Cl.

| | | |
|---|---|---|
| H04N 13/00 | (2006.01) | |
| H04N 21/2381 | (2011.01) | |
| H04N 21/41 | (2011.01) | |
| H04N 21/414 | (2011.01) | |
| H04N 21/436 | (2011.01) | |
| H04N 21/4363 | (2011.01) | |
| H04N 21/438 | (2011.01) | |
| H04N 21/4402 | (2011.01) | |
| H04N 21/442 | (2011.01) | |

(56) References Cited

U.S. PATENT DOCUMENTS

| | | | |
|---|---|---|---|
| 6,876,698 | B1 | 4/2005 | Dick et al. |
| 7,079,068 | B2 | 7/2006 | Clement et al. |
| 7,359,013 | B2 | 4/2008 | Sung et al. |
| 2001/0024230 | A1 | 9/2001 | Tsukahara |
| 2004/0070673 | A1 | 4/2004 | Nakamura |
| 2005/0212984 | A1 | 9/2005 | Wu et al. |
| 2005/0259147 | A1* | 11/2005 | Nam et al. ............ 348/43 |
| 2006/0117259 | A1* | 6/2006 | Nam et al. ............ 715/719 |
| 2007/0043748 | A1 | 2/2007 | Bhalotia et al. |
| 2007/0135038 | A1 | 6/2007 | Peele |
| 2007/0280546 | A1 | 12/2007 | Kwak et al. |
| 2007/0290906 | A1 | 12/2007 | Reefman et al. |
| 2008/0303894 | A1 | 12/2008 | Ernst et al. |
| 2009/0006471 | A1 | 1/2009 | Richardson et al. |
| 2009/0027381 | A1 | 1/2009 | Lee |
| 2009/0031035 | A1* | 1/2009 | Dharmaraju et al. ...... 709/230 |
| 2009/0141022 | A1 | 6/2009 | Kimpe |
| 2009/0141121 | A1 | 6/2009 | Kimpe |
| 2009/0190028 | A1 | 7/2009 | Rodriguez et al. |
| 2009/0290645 | A1 | 11/2009 | Mabey |
| 2011/0032338 | A1 | 2/2011 | Raveendran et al. |

FOREIGN PATENT DOCUMENTS

| | | |
|---|---|---|
| DE | 102005041249 | 3/2007 |
| EP | 1248473 A1 | 10/2002 |
| JP | 2003101690 A | 4/2003 |
| JP | 2004236264 A | 8/2004 |
| JP | 2005073049 A | 3/2005 |
| JP | 2005533433 A | 11/2005 |
| JP | 2006135747 A | 5/2006 |
| JP | 2006140553 A | 6/2006 |
| JP | 2006191357 A | 7/2006 |
| JP | 2006238121 A | 9/2006 |
| JP | 2007529960 A | 10/2007 |
| JP | 2008278032 A2 | 11/2008 |
| JP | 2009100071 A | 5/2009 |
| JP | 2009157526 A | 7/2009 |
| KR | 20050026959 A | 3/2005 |
| WO | 9829860 A1 | 7/1998 |
| WO | 2004008768 A1 | 1/2004 |
| WO | 2004084560 A1 | 9/2004 |
| WO | 2005091650 A2 | 9/2005 |
| WO | WO2007040472 | 4/2007 |
| WO | 2007096051 A1 | 8/2007 |
| WO | 2009091383 A2 | 7/2009 |
| WO | WO 2010084436 A1 * | 7/2010 |

OTHER PUBLICATIONS

Kim, M. et al. ("The Adaptation of 3D Stereoscopic Video in MPEG-21 DIA"; Signal Processing: Image Communication; vol. 18, Issue 8; Sep. 2003; pp. 685-697).*

Kim, M. et al. ("The Adaptation of 3D Stereoscopic Video in MPEG-21 DIA"; Signal Processing: Image Communication; vol. 18, Issue 8; Sep. 2003; pp. 685-697.*

Hoffman et al., "RTP Payload Format for MPEG1/MPEG2 Video," Network Working Group, RFC 2250, Jan. 1998, 15 pp.

Handley et al., "Guidelines for Writers of RTP Payload Format Specifications," Network Working Group, RFC 2736, Dec. 1999, 10 pp.

Kikuchi et al., "RTP Payload Format for MPEG-4 Audio/Visual Streams," Network Working Group, RFC 3016, Nov. 2000, 20 pp.

Schulzrinne et al., "RTP: A Transport Protocol for Real-Time Applications," Network Working Group RFC 3550, Jul. 2003, 105 pp.

Van Der Meer et al., "RTP Payload Format for Transport of MPEG-4 Elementary," Network Working Group, RFC 3640, Nov. 2003, 34 pp.

Wenger et al., "RTP Payload Format for H.264 Video," Network Working Group, RFC 3984, Feb. 2005, 78 pp.

De Bont et al., "RTP Payload Format for Elementary Streams with MPEG Surround Multi-Channel Audio," Network Working Group, RFC 5691, Oct. 2009, 13 pp.

Wu et al., "A Novel Method for Semi-automatic 2D to 3D Video Conversion," 3DTV-CON '8, May 28-30, 2008, Istanbul, Turkey, 4 pp.

Phillips, "3D Interface Specifications: White Paper," Apr. 8, 2009, 29 pp.

Akeley et al., "A Stereo Display Prototype with Multiple Focal Distances," Term paper from Stanford University, University of California, Berkeley, 2004, pp. 804-813.

Chris Ward: "Lightspeed Releases the New Depth Q(R) Family of Stereoscopic HD Video Software" Lightspeed Design Inc Jun. 24, 2009, XP002603311 Retrieved from the Internet : URL: h t t p ://www. Seopress releases .com/1 ights peed-releases-depthqr-family-stereoscopichd- video-software/3058 [ retrieved on Oct. 1, 2010].

De Bont, et al., "RTP Payload Format for Elementary Streams with MPEG Surround Multi-Channel Audio," Network Working Group, RFC 5691, Oct. 2009, 13 pp.

Fehn C: "Depth-image-based rendering (DIBR), compression, and transmission for a new approach on 3D-TV" Proceedings of the International Society for Optical Engineering (S P I E), S P I E , USA LNKD- DOI:10.1117/12.524762, vol. 5291, May 31, 2004, pp. 93-104, XP002444222 ISSN: 0277-786X p. 96.

Gharai USC/ISI C Perkins University of Glasgow L: "RTP Payload Format for Uncompressed Video; rfc4175.txt" IETF Standard, Internet Engineering Task Force, IETF, CH, Sep. 1, 2005, XP015041834 ISSN: 0000-0003 the whole document.

Green: "An Introduction to Orthogonal Frequency Division Multiplex Technology" Mar. 26, 2008, pp. 1-66, XP002606872.

Handley, et al., "Guidelines for Writers of RTP Payload Format Specifications," Network Working Group, RFC 2736,Dec. 1999, 10 pp.

Hoffman, et al., "RTP Payload Format for MPEG'IIMPEG2 Video," Network Working Group, RFC 2250, Jan. 1998,15pp.

International Search Report and Written Opinion—PCT/US2010/044469, International Search Authority—European Patent Office—Oct. 28, 2010.

Kikuchi, et al., "RTP Payload Format for MPEG-4 AudioNisual Streams," Network Working Group, RFC 3016,Nov. 2000,20 pp.

Kim M B, et al., "The adaptation of 3D stereoscopic video in MPEG-21 DIA" Signal Processing. Image Communication, Elsevier Science Publishers, Amsterdam, NL LNKD- DOI:10.1016/S0923-5965(03)00059-6, 26, vol. 18, No. 8, Sep. 1, 2003, pp. 685-697, XP004452905 ISSN: 0923-5965.

Merkle P, et al., "Video plus depth compression for mobile 3D services" 3DTV Conference: The True Vision—Capture, Transmission and Display of 3D Video, 2009, IEEE, Piscataway, NJ, USA, May 4, 2009, pp. 1-4, XP031471558 ISBN: 978-1-4244-4317-8 the whole document.

Schulzrinne, et al., "RTP: A Transport Protocol for Real-Time Applications," Network Working Group RFC 3550,Jul. 2003, 105 pp.

Smolic Aljoscha, et al., "An overview of available and emerging 3D video formats and depth enhanced stereo as efficient generic solution A A" Picture Coding Symposium 2009; Jun. 5, 2009-Aug. 5, 2009; Chicago, May 6, 2009, XP030081895 the whole document.

Tekalp A M, et al., "3DTV over IP" IEEE Signal Processing Magazine, IEEE Service Center, Piscataway, No, US LNKDDOI: 10.1109/MSP.2007.905878, vol. 24, No. 6, Nov. 1, 2007, pp. 77-87, XP011197676 ISSN: 1053-5888.

Van Der Meer, et al., "RTP Payload Format for Transport of MPEG-4 Elementary," Network Working Group, RFC 3640, Nov. 2003, 34 pp.

Wenger, et al., "RTP Payload Format for H.264 Video," Network Working Group, RFC 3984, Feb. 2005, 78 pp.

(56) References Cited

OTHER PUBLICATIONS

Wu, et al., "A Novel Method for Semi-automatic 2D to 3D Video Conversion," 3DTV-CON '8, May 28-30, 2008, Istanbul, Turkey, 4 pp.

Y-K Wang Huawei Technologies T Schierl Fraunhofer HHI: "RTP Payload Format for MVC Video; draft-wang-avt-rtp-mvc-03.txt" RTP Payload Format for MVC Video; Draft-Wang-AVT-RTP-MVC-03.TXT, Internet Engineering Task Force, IETF; Standardworkingdraft, Internet Society (ISOC) 4, Rue Des Falaises CH- 1205 Geneva, Switzerland, No. 3, Feb. 18, 2009, XP015061856 the whole document.

Chris Ward: "Lightspeed Releases the New Depth Q(R) Family of Stereoscopic HD Video Software" Lightspeed Design Inc Jun. 24, 2009, XP002603311 Retrieved from the Internet:URL:http://www.Seopressreleases.com/lightspeed-releasesdepthqr-family-stereoscopichd-video-software/3058[retrieved on Oct. 1, 2010].

Fehn C: "Depth-image-based rendering (DIBR), compression, and transmission for a new approach on 3D-TV" Proceedings of the International Society for Optical Engineering (SPIE), SPIE, USA LNKD—D0I:10.1117/12.524762, vol. 5291, May 31, 2004, pp. 93-104, XP002444222 ISSN: 0277-786X p. 96.

Handley, et al., "Guidelines for Writers of RTP Payload Format Specifications," Network Working Group, RFC 2736, Dec. 1999, 10 pp.

Hoffman, et al., "RTP Payload Format for MPEG'IIMPEG2 Video," Network Working Group, RFC 2250, Jan. 1998, 15pp.

International Search Report and Written Opinion-PCT/US2010/044469, International Search Authority—European Patent Office—Oct. 28, 2010.

Kikuchi, et al., "RTP Payload Format for MPEG-4 AudioNisual Streams," Network Working Group, RFC 3016, Nov. 2000, 20 pp.

Kim M B, et al., "The adaptation of 3D stereoscopic video in MPEG-21 DIA" Signal Processing. Image Communication, Elsevier Science Publishers, Amsterdam, NL LNKD—DOI:10.1016/50923-5965(03)00059-6, 26, vol. 18, No. 8, Sep. 1, 2003, pp. 685-697, XP004452905 ISSN: 0923-5965.

Schulzrinne, et al., "RTP: A Transport Protocol for Real-Time Applications," Network Working Group RFC 3550, Jul. 2003, 105 pp.

Van Der Meer, et al., "RTP Payload Format for Transport of MPEG-4 Elementary,".

Network Working Group, RFC 3640, Nov. 2003, 34 pp.

Y-K Wang Huawei Technologies T Schierl Fraunhofer HHI: "RTP Payload Format for MVC Video; draft-wang-avt-rtp-mvc-03.txt" RTP Payload Format for MVC Video; Draft-Wang-AVT-RTP-MVC-03.TXT, Internet Engineering Task Force, IETF; Standardworkingdraft, Internet Society (ISOC) 4, Rue Des Falaises CH-1205 Geneva, Switzerland, No. 3, Feb. 18, 2009, XP015061856 the whole document.

Wenger et al., "RTP Payload Format for H264 Video," Network Working Group, RFC 3984, Feb. 2005, 78 pp.

Hewage C.T.E.R., et al., "Quality Evaluation of Color Plus Depth Map-Based Stereoscopic Video," IEEE Journal of selected topics in signal processing, Apr. 1, 2009, vol. 3 (2), pp. 304-318.

Lu F., et al., "Quality Assessment of 3D Asymmetric view coding using spatial frequency dominance model," 3DTV Conference: The True Vision-Capture, Transmission and Display of 3D Video, 2009, May 4, 2009, pp. 1-4, XP031471538, ISBN: 978-1-4244-4317-8.

* cited by examiner

PREPARING VIDEO DATA IN ACCORDANCE WITH A WIRELESS DISPLAY PROTOCOL

This application claims the benefit of U.S. Provisional Application No. 61/231,921, filed Aug. 6, 2009.

The present application for patent is related to the following co-pending U.S. patent applications:

"Transforming Video Data in Accordance with Human Visual System Feedback Metrics," 12/779,787 filed concurrently herewith, assigned to the assignee hereof and expressly incorporated by reference herein;

"Transforming Video Data in Accordance with Three Dimensional Input Formats," 12/779,814 filed concurrently herewith, assigned to the assignee hereof and expressly incorporated by reference herein; and "Encapsulating Three-Dimensional Video Data in Accordance with Transport Protocols," 12/779,757 U2, filed concurrently herewith, assigned to the assignee hereof and expressly incorporated by reference herein

TECHNICAL FIELD

The disclosure relates to video data processing and, more particularly, delivery of video data for presentation to viewers.

BACKGROUND

Video display devices present video data for viewing by a user. Typically, the video data presented by a display device comprises a sequential series of video frames that are intended for playback at a given rate, e.g., 29.97 frames per second as set forth in National Television Systems Committee (NTSC) standards. As this video data does not contain any depth information, the video data is characterized as two-dimensional (2D) video data. Display devices that present this 2D video data are often referred to as "2D displays."

Currently, three-dimensional (3D) display devices are being developed to present three-dimensional (3D) video data. These so-called "3D displays" may require additional viewing accessories, such as shutter glasses, polarized glasses or bi-color glasses (e.g., glasses with one red and one green colored lens) to properly view the presented 3D video data. 3D display devices that require additional viewing accessories are often referred to as "stereoscopic 3D displays." Other 3D display devices referred to as "auto-stereoscopic 3D displays" are capable of presenting 3D video data that is viewable by viewers without the need for any additional viewing accessories.

Whether stereoscopic or auto-stereoscopic, 3D displays of different manufacturers typically require 3D video data that complies with a vendor- or manufacturer-specific input file format. For example, one proposed 3D video data format comprises 2D video data plus depth information, and is referred to as "2D-plus-depth." A 2D-plus-depth display device may only present 3D video data provided in the 2D-plus-depth 3D video data format. Other types of 3D displays may require 3D video data in a multi-view 2D stream format. The multi-view 2D stream format packages a plurality of 2D streams, where the 2D streams are each acquired from the same scene with different capture elements (e.g., cameras) at the same time (ideally, synchronized). As a result of these different and typically proprietary 3D video data formats, a given 3D display device from one manufacturer may only present 3D video data that is formatted in accordance with that manufacturer's proprietary 3D video data format.

SUMMARY

In general, techniques are described for enabling cross-platform three-dimensional (3D) video data playback. The term "platform" generally refers to the software and hardware computing framework of a particular video display device, and/or any supporting devices, such as an audio/video receiver, and the limitations and functionality of this framework with respect to video decoding and playback. In various aspects, the techniques may transform video data, whether two-dimensional (2D) or 3D video data, into 3D video data in a manner that enables playback on different 3D video playback platforms. In this respect, the techniques may, in various aspects, promote cross-platform 3D video playback.

In one aspect, a portable device comprises a module to store video data, a wireless display host module that determines one or more display parameters of a three-dimensional (3D) display device external from the portable device, and prepares the video data to generate 3D video data based on the determined display parameters, and a wireless interface that wirelessly transmits the 3D video data to the external 3D display device.

In another aspect, a method comprises storing, with a portable device, video data, determining, with a wireless display host module of the portable device, one or more display parameters of a three-dimensional (3D) display device external from the portable device, preparing, with the wireless display host module, the video data to generate 3D video data based on the determined display parameters, and transmitting, with the portable device, the 3D video data to the external 3D display device.

In another aspect, a portable device comprises means for storing video data, means for determining one or more display parameters of a three-dimensional (3D) display device external from the portable device, means for preparing the video data to generate 3D video data based on the determined display parameters, and means for transmitting the 3D video data to the external 3D display device.

In another aspect, a computer-readable storage medium comprising instructions that cause a processor to store video data, determine one or more display parameters of a three-dimensional (3D) display device external from the portable device, prepare the video data to generate 3D video data based on the determined display parameters, and transmit the 3D video data to the external 3D display device.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
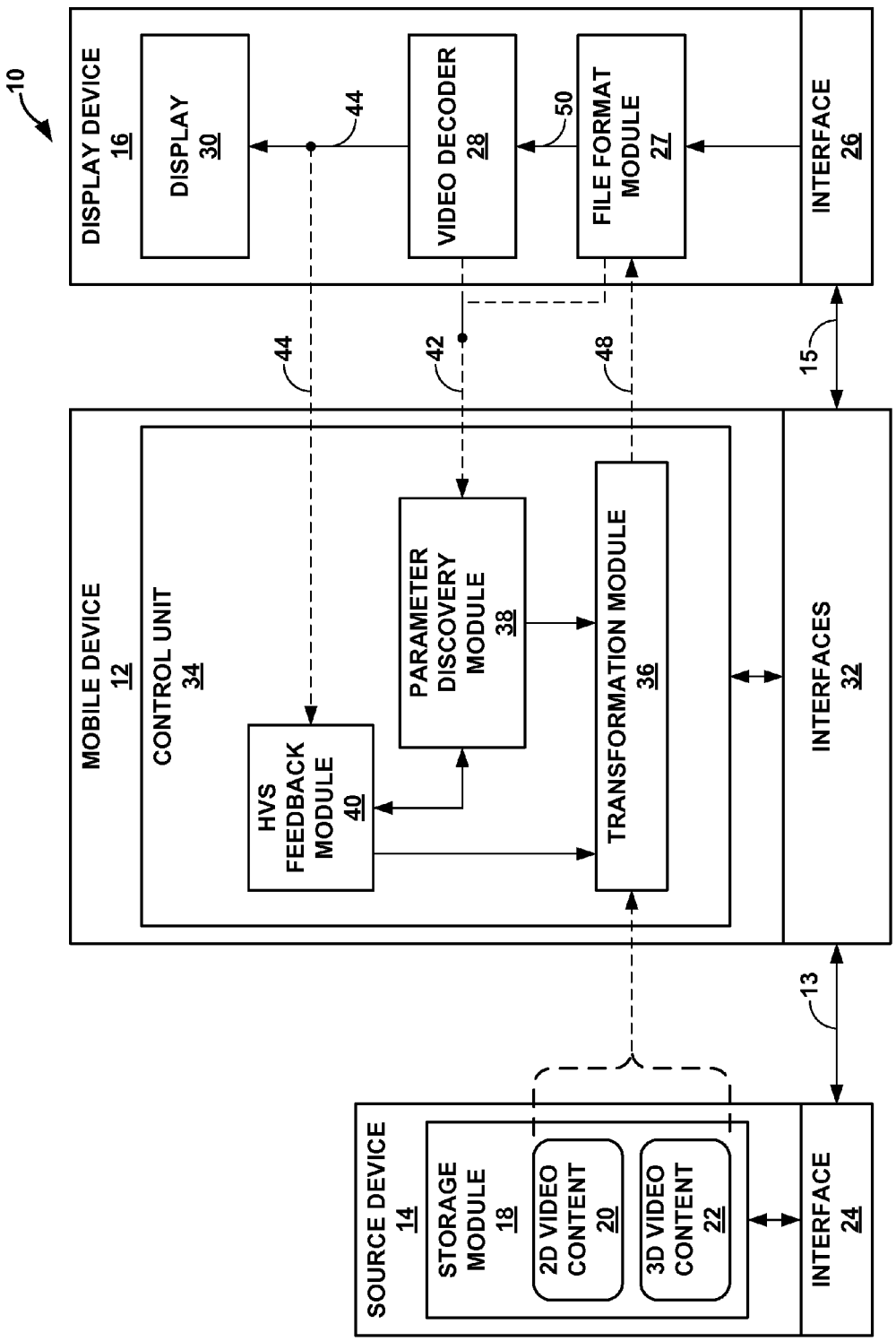
FIG. 1 is a block diagram illustrating a system in which a mobile device implements various aspects of the techniques of this disclosure to promote cross-platform video data playback.

This disclosure is directed to techniques that promote cross-platform three-dimensional (3D) video playback. The term "platform" generally refers to the software and hardware computing framework of a particular video display device, and/or any supporting devices, such as an audio/video receiver, and the limitations and functionality of this framework with respect to video decoding and playback. A two-dimensional (2D) display device typically provides a platform by which to receive, decode and present video data formatted in accordance with Moving Pictures Experts Group (MPEG) standard part two, which is commonly known as "MPEG-2." Other hybrid display devices capable of presenting both 2D and three-dimensional (3D) video data may provide a hybrid platform capable of receiving, decoding and presenting video data formatted in accordance with the MPEG-2 standard and a particular 3D video data format, such as a proprietary, manufacturer-specific format. Examples of proprietary formats include a 2D-plus-depth format (which may be referred to as a "2D-plus-z" format, where the "z" stands for depth), a 2D-plus-depth-occlusion-and-global-effects (in which transparency is a particular type of global-effect) and a multiview 2D stream format. A 3D-only display device typically provides a platform by which to receive, decode and present 3D video data formatted in accordance with one of the manufacture-specific 3D formats.

The techniques promote cross-platform 3D video playback by enabling 3D video playback over a number of different 3D video platforms. Currently, no one manufacturer-specific, proprietary, or even open-source or other "free" 3D video formats have been standardized or gained industry-wide acceptance. Instead, manufacturers associated with each of these various formats are attempting to promote such standardization in the marketplace. Moreover, due to the competition between different formats none of these 3D video formats support cross-platform 3D video playback. Cross-platform 3D video playback generally refers to the ability of one platform to playback 3D video data formatted for a different platform. Consequently, 3D video data formatted in one format typically cannot be displayed by a 3D display device providing a platform that receives, decodes and presents 3D video data formatted in another, different format. In this respect, the techniques of this disclosure may promote cross-platform 3D video playback by transforming 3D video data from one format to another format.

Cross-platform 3D video playback also involves transforming 2D video data to 3D video data for playback on a 3D display device. The term "cross-platform" therefore also may include 2D platforms as well as 3D platforms, where the techniques may comprise receiving 2D video data and transforming this 2D video data to 3D video data formatted in accordance with a 3D video data format supported by a particular 3D display device or hybrid 2D/3D display device. A hybrid 2D/3D display device comprises a display device capable of both 2D and 3D video decoding and playback.

The techniques may promote cross-platform 3D video playback in a number of aspects. In one aspect, the techniques may facilitate video display interrogation to determine a 3D video data format supported by a video display device under interrogation. This interrogation may occur automatically or without user input other than initial user input to select one or more 3D display devices for interrogation. After automatically determining this 3D video data format of a 3D display device, the techniques may involve automatically (e.g., without any user input) configuring one or more modules that convert 2D video data into 3D video data so as to generate 3D video data in accordance with the automatically determined 3D video data format. The configured modules then receive 2D video data and transform or otherwise convert this 2D video data into 3D video data that complies with the automatically determined input format of the display device. This 3D video data is sent to the 3D display device, which proceeds to decode and present this 3D video data for viewing by a user.

In another aspect, the techniques may promote cross-platform 3D video playback by reconfiguration of one or more of the modules that transform the video data to 3D video data based on monitored parameters that reflect a quality of 3D visualization of the 3D video data during playback of the 3D video data by the particular 3D display device. This reconfiguration may occur dynamically during the transformation of the video data. The reconfiguration of the modules refines the generation of the 3D video data to dynamically improve the quality of 3D visualization produced by the 3D display device. The reconfiguration of the modules may also serve the purpose of reducing the processing complexity for an acceptable 3D video quality. The processing complexity may be reduced by disabling the execution of some of the modules or selecting simpler processes to perform the same functionality according to the reconfiguration parameters. A simpler process may induce a reduced 3D video quality that should still be considered acceptable according to the user-defined criteria. Reducing the processing complexity may reduce power consumption or may speed up the execution of the functionality of the modules. Notably, the monitoring of the parameters and reconfiguration of the modules used to transform the video data, either 2D or 3D video data, into 3D video data formatted for a specific 3D display device may occur in near real-time or while streaming the 3D video data to the 3D display device.

In another aspect, the techniques may promote cross-platform 3D video playback for a certain class of 3D display devices that provide wireless interfaces. A device that implements this aspect of the techniques may comprise a first module to store video data and a wireless display host module that determines one or more display parameters of a display device external from the portable device. These display parameters may comprise a display resolution of the display device, file formats supported by the display device, video data encoder/decoder techniques (so-called "video codecs") supported by the display device, audio codecs supported by the display device, whether the display device supports 3D video data playback, and other parameters concerning capabilities or additional aspects of the display device. The device that implements this aspect of the techniques also may include a third module that prepares the video data to generate video data for playback on the external display device based on the determined display parameters and a wireless module that wirelessly transmits the 3D video data to the external display device.

Notably, various aspects of the techniques may be implemented by a portable device, including a wireless cellular handset, which is often referred to as a cellular or mobile phone. Other portable devices that may implement the various aspects of the techniques include so-called "smart phones," extremely portable computing devices referred to as "netbooks," laptop computers, portable media players (PMPs), and personal digital assistants (PDAs). The techniques may also be implemented by generally non-portable devices, such as desktop computers, set-top boxes (STBs), workstations, video playback devices (e.g., a digital video disc or DVD player), 2D display devices and 3D display devices. Thus, while described in this disclosure with respect to a mobile or portable device, the various aspects of the techniques may be implemented by any computing device capable of receiving and forwarding video data to an external display device.

FIG. 1 is a block diagram illustrating a system 10 in which a mobile device 12 implements various aspects of the techniques of this disclosure to promote cross-platform video data playback. As shown in the example of FIG. 1, system 10 includes a source device 14 and a display device 16, both of which communicate with mobile device 12 via a wireless communication channel 13 and 15, respectively. Source device 14 may include a general purpose multimedia device, such as a personal computer, a workstation, a personal digital assistant (PDA), a mobile phone (including a so-called "smart phone"), or any other type of device comprising a general purpose processor capable of executing software and, particularly, multimedia software. Source device 14 may alternatively comprise a dedicated multimedia device, such as a video camcorder, a digital video disc (DVD) player, a television, a set-top box (STB), a compact disc (CD) player, a digital media player (e.g., a so-called "MP3" player or a combination MP3/MP4 player, as well as, other media players that play other formats, including advanced audio coding (AAC), Windows media video (WMV) and Waveform audio video (WAV) formats), a digital video recorder (DVR), a global positioning system (GPS) device, or any other device dedicated to a set of one or more multimedia applications and that typically does not enable user control over the loading and execution of multimedia software.

Display device 16 generally represents any device capable of video playback via a display. Display device 16 may comprise a television (TV) display, which may be referred to as a 2D video display device, a 3D video display device or a hybrid 2D/3D video display device depending on whether display device 16 supports 2D, 3D or a combination of 2D and 3D video data playback. Display device 16 may alternatively comprise any other device with a display, such as a laptop, a personal media player (PMP), a desktop computer, a workstation, a PDA, and a portable digital media player (such as a portable DVD player). For purposes of illustration, display device 16 is assumed to represent a wireless television that communicates with mobile device 12 wirelessly. The techniques of this disclosure should not, however, be limited to wireless televisions.

Source device 14 includes a storage module 18 that stores one or more of 2D video content 20 and 3D video content 22. Storage module 18 may comprise memory, either volatile or non-volatile memory, including random access memory (RAM), static RAM (SRAM), dynamic RAM (DRAM), Flash memory, read-only memory (ROM), programmable ROM (PROM), erasable PROM (EPROM), and electrically erasable PROM (EEPROM). Storage module 18 may alternatively comprise a storage device, such as a hard drive, an optical drive, a tape drive and a disk drive. Storage module 18 may, in some instances, comprise a combination of one or more memories and one or more storage devices.

2D video content 20 represents 2D video data formatted in accordance with a particular 2D video data file format. An example 2D video data file format may include an MP4 file format defined by a Moving Pictures Expert Group (MPEG) 4, part 14. The MP4 file format is a container file format that is typically used to store digital audio and digital video streams. Other container file formats comprise a simplified version of the MP4 file format referred to as 3GP, an Advanced Systems Format (ASF), an Advanced Video Interleave (AVI) file format, a DivX Media Format (DMF), an Enhanced Video Object (EVO) file format, and a Flash video file format. File formats may, in this aspect or other aspects, also refer to file formats used with respect to particular transport and/or application layer protocols, such as a Real-time Transport Protocol (RTP) and a Stream Control Transmission Protocol (SCTP).

3D video content 22 represents coded 3D video data formatted in accordance with a particular 3D video data file format. Exemplary 3D video data formats comprise a 2D plus depth (which is commonly referred to as "2D-plus-z" format), a 2D-plus-depth-occlusion-and-global-effects or multiview 2D stream file format. In this respect, a video data file format generally refers to a standard way of encapsulating video data, whether encoded or not. Thus, a video data file format may define a way of generally encapsulating video data or portions thereof to facilitate the storage and/or transmission of the video data. The video data may be encoded using a variety of codecs, such as MPEG-2 or any other codec, including those defined in the International Telecommunication Union Standardization Sector (ITU-T) H.264/MPEG-4, Part 10, Advanced Video Coding (AVC) standard (hereinafter "H.264/MPEG-4 AVC" standard). The video data may also be encoded, in some instances, using a codec referred to as H.265 or, by its moniker, next-generation video coding (NGVC), which is under development by the ITU-T Video Coding Experts Group (VCEG). The term video content is used in this disclosure to refer to coded video data encapsulated in accordance with a particular video data file format.

While not shown in FIG. 1 for ease of illustration, source device 14 may include additional modules, such as a video capture module, for capturing 2D video content 20 and 3D video content 22. Alternatively, source device 14 may act as an archive or repository for storing content 20, 22. In some instances, source device 14 may receive content 20, 22 wirelessly via an interface 24 included within source device 14. That is, source device 14 includes interface 24 by which to communicate wirelessly with external devices. In some instances, these external devices may interface with source device 14 via interface 24 to store content 20, 22 to storage module 18.

Display device 16, which as noted above may represent a wireless television display for illustrative purposes, includes an interface 26, a file format module 27, a video decoder 28 and a display 30. Interface 26, similar to interface 24, represents an interface by which devices external to display device 16 may communicate with display device 16. In this example, it is assumed that each of interfaces 24 and 26 represents wireless interfaces. File format module 27 represents a hardware or combination of hardware and software module that implements one or more of the file formats described above. Typically, file format module 27 performs decapsulation to remove file format headers that encapsulate the coded video data and thereby output the coded video data.

Video decoder 28 may represent a hardware or combination hardware and software module that implements one or more video codecs for decoding the coded video data. Notably, the term "codec" is used regardless of whether video decoder 28 implements both the encoding (i.e., compression) and the decoding (i.e., decompression) aspects of a given codec. Hence, video decoder 28 may be construed to implement a codec by implementing only the decompression aspects of that codec. In this respect, video decoder 28 may implement codecs, whether or not video decoder 28 implements both the compression and decompression aspects of the codec or only the decompression aspects of the codec.

Although not shown in the example of FIG. 1, display device 16 may also include other modules that represent hardware or a combination of hardware and software that implement one or more audio codecs. In some instances, the video and audio modules may be combined in the same module, which is commonly referred to as an audio/video (A/V) decoder. Display 30 may comprise any type of display, including a organic light emitting diode (OLED) display, a light emitting diode (LED) display, a plasma display, and a cathode-ray tube (CRT) display.

In the example of FIG. 1, mobile device 12 also includes one or more interfaces 32 that are substantially similar to interfaces 24 and 26 of respective source and display devices 14 and 16. Mobile device 12 also includes a control unit 34 that implements one or more aspects of the techniques described in this disclosure. Control unit 34 may comprise one or more processors (not shown in FIG. 1) that execute software instructions, such as those used to define a software or computer program, stored to a computer-readable storage medium (again, not shown in FIG. 1), such as a storage device (e.g., a disk drive, or an optical drive), or memory (e.g., a Flash memory, random access memory or RAM) or any other type of volatile or non-volatile memory that stores instructions (e.g., in the form of a computer program or other executable) to cause a programmable processor to perform the techniques described in this disclosure. Alternatively, control unit 34 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Control unit 34 includes a transformation module 36, a parameter discovery module 38 and a human visual system (HVS) feedback module 40 ("HVS feedback module 40"). Transformation module 36 represents one or more configurable hardware modules or a combination of one or more hardware and software configurable modules that transform either one or both of 2D video content 20 and 3D video content 22 to video data acceptable to or compatible with display device 16 in accordance with various aspects of the techniques described in this disclosure. Video data may be "compatible" with display device 16 when the resulting transformed video data is encoded in accordance with a video codec supported by video decoder 28 and formatted in accordance with a file format supported by file format module 27.

Parameter discovery module 38 represents one or more hardware modules, some of which may execute software, that interface with display device 16 to discover one or more parameters 42 of display device 16, including one or more file formats supported by display device 16, in accordance with one or more aspects of the techniques described in this disclosure. These formats typically comprise one or more file formats supported by file format module 27 of display device 16. Often, formats 42 imply one or more types of codecs supported by video decoder 28 and therefore parameter discovery module 38 may also discover a particular codec supported by video decoder 28.

In addition to file formats, parameters 42 may include supported resolutions, a current resolution, supported contrast, a current contrast, a display or screen size, audio and video codecs supported by display device 16, a list of interfaces 26, a current sharpness, a supported sharpness, a supported color temperature, a current color temperature, a supported brightness, a current brightness, supported display format, a current display format, supported color settings, current color settings, supported input formats, a display type, a display manufacturer, a supported depth range, a current depth range, a supported locations for the convergence plane, a current location of the convergence plane, a supported degree of smoothness of background objects, a current smoothness of background objects, a supported eye-distance configuration, a current eye-distance configuration, a supported dominant-eye configuration, a current dominant-eye configuration, a supported number of views, a current number of views, a supported viewing distance, a current viewing distance, a supported viewing angle, a current viewing angle, a supported display location of the 3D video content within a screen, and a current location of the 3D video content within a screen, and any other parameters related to display device 16 and its capabilities.

In any event, parameter discovery module 38 discovers formats, which may include both file formats and coding formats or techniques, such as supported codecs. For example, discovering the 3D file format referred to as 2D plus depth implies that video decoder 28 supports a 3D video codec capable of decoding the coded 2D video data portion of 2D plus depth file format coded in accordance, for example, with the MPEG-2 standard, while also decoding the depth portion of the 2D-plus-depth file format to render 3D video data for playback via display device 30.

HVS feedback module 40 represents one or more hardware modules or a combination of hardware and software modules that analyze qualitative and quantitative metrics concerning display of 3D video data by display device 16. HVS feedback module 40 may analyze qualitative and quantitative metrics and then reconfigure transformation module 36 to improve transformation of the input video data, e.g., 2D video content 20 or 3D video content 22, to video data that complies with an input format discovered by parameter discovery module 38 in accordance with various aspects of the techniques described in this disclosure. HVS feedback module 40 may interface with display device 16 to retrieve video data 44 output by video decoder 28 of display device 16, which it then analyzes to determine these qualitative and quantitative metrics. Through this reconfiguration of transformation module 36, HVS feedback module 40 may promote better quality 3D video data playback.

In accordance with one aspect of the techniques described in this disclosure, mobile device 12 automatically determines a 3D input file format of a 3D display device and transforms 2D video content 20 into 3D video data so as to comply with the 3D input file format. For purposes of illustration, it is assumed that display device 16 comprises a hybrid 2D/3D wireless television capable of presenting both 2D and 3D video content 20 and 22. Parameter discovery module 38 of mobile device 12 may interface with display device 16 via wireless communication channel 15 to interrogate file format module 27 in order to determine at least one input file format supported by file format module 27 to receive 3D video data. As described above, file formats may comprise one or more 3D file formats, such as 2D-plus-depth or multiview 2D stream format, as well as, one or more codecs implemented by video decoder 28 to decode 3D video data, which may be implied by the determined file format.

Notably, display device 16 may implement a first file format, while other display devices not shown in FIG. 1 may implement a plurality of different file formats different from the first file format. The plurality of different file formats may prevent cross-platform playback of 2D video data but, more particularly, of 3D video data, as 3D video file formats have not been standardized or generally adopted within the industry. By discovering the display file format and then transforming any input or source video data into the discovered file format may overcome cross-platform playback issues that may arise when attempting to decode and present 3D video data formatted in a first file format on a display device that accepts a second, different file format.

Initially, a user or other operator of mobile device 12 may interface with a user interface presented by user interface module (not shown in FIG. 1 for ease of illustration) to select or otherwise discover display device 16. The user interface may present a list of devices located within a given range of mobile device 12 or connected to a network (such as an 802.11x wireless network, a ultra-wideband (UWB) network, and/or a Bluetooth™ network) to which mobile device 12 is likewise connected. The operator may interface with the user interface to select a device, such as display device 16, whereupon the user interface module informs parameter discovery module 38 of the selected display device 16.

While manual selection may occur in this manner, parameter discovery module 38 may automatically interface with each device in a list to discover parameters, such as a file form, for each device on the list. The user interface may then present the list and receive input from the operator or other user selecting one of the devices. In other words, parameter discovery module 38 may automatically discover parameters, including formats, in response to a user selecting a given device on a list of devices to which mobile device 12 may interface or without waiting for such selection. The discovery may be "automatic" in the sense that the discovery occurs without any further user input. Parameter discovery module 38 may interface with display device 16, for example, interrogate file format module 27 and receive formats supported by display device 16 as one of parameters 42 without requiring any user input.

Parameter discovery module 38 interfaces with display device 16 via an appropriate one of interfaces 32 that is coupled to interface 26 of display device 16 via communication channel 15. Parameter discovery module 38 may implement an interrogation protocol by which to communicate with file format module 27. For example, parameter discovery module 38 may implement various aspects of a display interface protocol or standard, such as a high-definition multimedia interface (HDMI) protocol or wireless HDMI (WHDMI) protocol, that provides a communication channel by which to determine various parameters, which may be characterized as capabilities and characteristics, of display device 16. While no specific standard has yet been set forth that defines WHDMI, looking to the wired-version of HDMI, as set forth in a specification entitled "High-Definition Multimedia Interface Specification Version 1.3A," dated Nov. 10, 2006, which is hereby incorporated by reference in its entirety, there exists a display data channel (DDC) by which to interrogate or otherwise determine parameters 42 of display device 16, including supported file formats.

While described in this disclosure with respect to HDMI and WHDMI, the techniques may be implemented in accordance to open standards, such as non-proprietary standards, as well as, other specifications not specifically supported or as of yet incorporated into any standard, either proprietary or open. For example, parameter discovery module 38 may implement a mobile display digital interface (MDDI), which is an interface defined in an open standard supported by the Video Electronics Standards Association. Alternatively, or in conjunction with MDDI, parameter discovery module 38 may implement the wireless extension to MDDI referred to as wireless MDDI (WMDDI). Moreover, the techniques may be implemented with respect to a mobile industry processor interface (MIPI). The techniques should not therefore be limited in this respect to any one standard interface, such as HDMI.

After discovering formats 42 in this manner, parameter discovery module 38 then interfaces with transformation module 36 to configure transformation module 36, which as described above represents one or more modules that convert both 2D and 3D video data into 3D video data that complies with determined input format 42. Parameter discovery module 38 may determine configuration data and load this configuration data into transformation module 36 so as to configure transformation module 36 to transform video content, such as 2D video content 20, into 3D video content formatted in accordance with input format 42.

The user interface described above, but not shown in FIG. 1 to ease illustration, may also present another list of devices, which may be referred to as a "source list" to differentiate this list from the display list (which may be characterized as a "destination list"), that includes sources for video content. Mobile device 12 may discover these devices via interfaces 32 similar to discovering the devices of the destination list. Mobile device 12, as one example, discovers source device 14 via interfaces 32 and communication channel 13, where the user interface presents a source list that included source device 14. Assuming the operator selects source device 14, control unit 34 may instruct interfaces 32 to interface with source device 14 to determine content 20 and 22 stored to storage module 18 of source device 14. The user interface of control unit 34 may then present filenames, images or other data representative of determined 2D video content 20 and 3D video content 22. The operator may select either 2D video content 20 or 3D video content 22 for display on the selected destination device, e.g., display device 16.

Assuming the operator selects 2D video content 20 for display on the selected display device 16 in 3D, transformation module 36 begins receiving 2D video content 20, which may be formatted in one of the above describe 2D file formats and coded in accordance with a first codec. Configured transformation module 36 may dynamically convert, possibly in real-time or near real-time, 2D video content 20, which comprises file formatted and coded video data, into 3D video data that is coded and formatted in a file format that complies with automatically determined input format 42. Transformation module 36 then forwards the dynamically generated 3D video data that is coded and formatted in a file format that complies with automatically determined input format 42 (which is shown in FIG. 1 as 3D video content 48) to display device 16 via communication channel 15 and interfaces 32, 26.

File format module 27 of display device 16 receives 3D video content 48 that comprises 3D video data coded in accordance with a codec supported by video decoder 28 and then formatted in accordance with a 3D file format supported by file format module 27. File format module 27, due to the compliant file formatting, decapsulates 3D video content 48 to generate coded 3D video data 50. Video decoder 28 then decodes coded 3D video data 50 using the appropriate codec to generate 3D video data 44, which display 30 presents for consumption by a viewer, e.g., the operator of mobile device 12.

In this manner, this aspect of the techniques facilitate cross-platform 3D video playback by dynamically configuring transformation module 36 to generate 3D video data from 2D video content 20 such that the 3D video data complies with a format 42 supported by display device 16. Often, such 2D video content 20 may be limited to 2D platforms and while it may be assumed that hybrid 2D/3D display device 16 could utilize the 2D portion of the hybrid 2D/3D platform to present 2D video content 20, the viewer would be denied a 3D viewing experience without the intervening or intermediate transformation capabilities of mobile device 12 performed in accordance with the techniques described in this disclosure. In this respect, the techniques of this disclosure enable mobile device 12 to promote cross-platform video playback by facilitating the playback of 2D video content 20 on a 3D video playback platform.

While transformation module 36 transforms 2D video content 20 to generate 3D video data in the format supported by display device 16 (shown in FIG. 1 as 3D video content 48) and forwards the transformed 3D video content 48 to display device 16, HVS feedback module 40 may determine one or more metrics using an HVS model that reflect a quality of 3D visualization of the generated 3D video content 48 with respect to a human visual system. More particularly, in some examples, HVS feedback module 40 interfaces with display device 16 to determine 3D video data 44 and analyzes 3D video data 44 using the HVS model to determine the one or more metrics.

The one or more metrics may comprise a size and/or a depth metric for each of one or more objects depicted by 3D video data 44, where, in some instances, the depth metric may be expressed as a function of time, a shadow metric for each of one or more shadows depicted by 3D video data 44, a background contrast metric, a sharpness metric, a spatial frequency metric, as well as, a wide variety of other metrics, each of which is described in more detail below. In addition, HVS feedback module 40 may interface with parameter discovery module 38 to receive one or more parameters determined by parameter discovery module 38, such as supported resolutions, a current resolution, supported contrast, a current contrast, a display or screen size, file formats or any other parameters related to display device 16 and its capabilities. HVS feedback module 40 may base the reconfiguration of transformation module 38 at least partially on these parameters 42.

HVS feedback module 40 may also store user preference data that defines one or more user preferences, such as a desired sharpness, a desired contrast, a desired display format, a desired color temperature, desired color settings, a desired brightness, a desired maximum depth range, a desired location of a convergence plane, a desired degree of smoothness of background objects, a desired eye-distance configuration, a desired dominant-eye configuration, a desired number of views, a desired viewing distance, a desired viewing angle, a desired display location and resolution of the 3D video content within the screen or any other preference related to 2D or 3D visual display by a display device, such as display device 16. HVS feedback module 40 may again also reconfigure transformation module 38 based at least partially on these user preferences. That is, HVS feedback module 40 may comprise an HVS model, which is configured in accordance with the user preference data so as generate configuration data used to reconfigure transformation module 38 based at least partially on these user preferences.

In this way, HVS feedback module 40 interfaces with transformation module 36, while transformation module 36 is currently transforming 2D video content 20 (or, in alternative instances, 3D video content 22), to reconfigure transformation module 36 based at least on the metrics determined through analysis of 3D video data 44 to refine the generation of 3D video content 48. In this respect, HVS feedback module 40 may dynamically reconfigure transformation module 36 to automatically refine, and likely improve, the perceived visual qualities of 3D video content 48. If such refinement is based on user preference data in addition to the metrics determined from 3D video data 44, HVS feedback module 40 may automatically reconfigure transformation module 36 to refine the perceived quality of 3D video content 48 for a specific user or on a per-user basis. Accordingly, the techniques may not only facilitate cross-platform video playback but also promote dynamic refinement of any transformation required for cross-platform video playback to improve the viewing experience potentially on a per-user basis.

In some instances, mobile device 12 interfaces with display device 16 via a wireless communication medium. Given the above assumption that display device 16 represents a hybrid 2D/3D wireless display device, mobile device 12 interfaces with display device 16 wirelessly. When interfacing with display device 16 wirelessly, parameter discovery module 38 may be characterized as a wireless display (WD) host that determines one or more display parameters 42 of display device 16. Parameter discovery module 38 then configures transformation module 36 in a manner such that transformation module 36 prepares the video data so as to generate 3D video content 48 based on the display parameters.

This preparation may involve formatting or, more specifically, encapsulating 3D video data in accordance with a transport protocol. The transport protocol defines encapsulation of each of the video data, audio data and depth data segments in a different one of a plurality of packets. In some instances, the video, audio and depth data may be sequentially stored within a single packet. The transport protocol module adds metadata for enhancing playback of the 3D video content within an optional data field in a header of one of the plurality of packets. This metadata may provide hints or other indications that facilitate playback on devices having specific capabilities. The metadata may also define tips or specifications for generating or otherwise transforming the 3D video data to enable playback on different 2D or 3D display devices with specific capabilities or parameters.

The transport protocol unit that performs this preparation may comprise a real-time transport protocol (RTP) unit comprising hardware or a combination of hardware and software, which is an application layer (and is also known as a "layer 7" or "L7") protocol unit. The term "layers" refers to layers within the Open Systems Interconnection reference model ("OSI model"). Typically, transport protocols are considered to fall within the transport layer (which is also referred to as "layer 4" or "L4") of the OSI model. RTP relies on a transport layer protocol, referred to as universal datagram protocol (UDP), to provide an enhanced transport protocol using application layer functionality. In this sense, RTP may be considered a transport protocol despite the fact that RTP resides at the application layer rather than the transport layer. The term "transport protocol" therefore should not be limited to transport layer protocols but may include any protocol of any layer in the OSI model that provides transport layer functionality.

After preparing 3D video content 48 in the manner described above, transformation module 36 forwards the content to a wireless one of interfaces 32, which transmits the packets to display device 16. Display device 16 receives the packets, un-formats the packets to decapsulate the encoded audio, encoded video and depth data as well as the metadata, decodes the encoded audio and encoded video data in accordance with the metadata to generate audio and enhanced video data and presents the audio and enhanced video data via audio playback module (not shown in FIG. 1) and display 30 for consumption by a viewer. The video data is "enhanced" in that the metadata may improve decoding and playback of the resulting video data that was decoded with benefit of the metadata.

In this respect, the various aspects of the techniques promote a cohesive cross-platform video playback system. In one aspect, file formats are discovered and used to configure a transformation module 36 to improve playback across platforms in the manner described above. In another aspect, the techniques facilitate the quality of playback through dynamic feedback determined using a HVS model so as to refine, during the transformation, the quality of 3D video playback. In yet another aspect, parameters are automatically determined and used to prepare delivery of 3D video data for playback by a 3D display device. This preparation may involve embedding metadata into packets used to transmit the 3D video content wirelessly to the display device, where this metadata may define parameters that facilitate decoding and further transformation of the 3D video content. In some aspects, this metadata may be embedded such that it is transparent to displays that do not support 3D video playback, such as 2D-only display devices.

While shown as separate devices, source device 12 and mobile device 16 may comprise a single device that incorporates the functionality of source device 12 and the functionality of mobile device 16. In some instances, mobile device 12 may incorporate the functionality of source device 14. In this respect, the techniques should not be limited to the example shown in FIG. 1.

Moreover, although described above with respect to a mobile device 12, the techniques may be implemented by any device capable of video transformation consistent with the techniques described in this disclosure. Such devices may be referred to herein generally as "video processing devices." Again, the techniques should not be limited in this respect to the example shown in FIG. 1.

Figure 2:
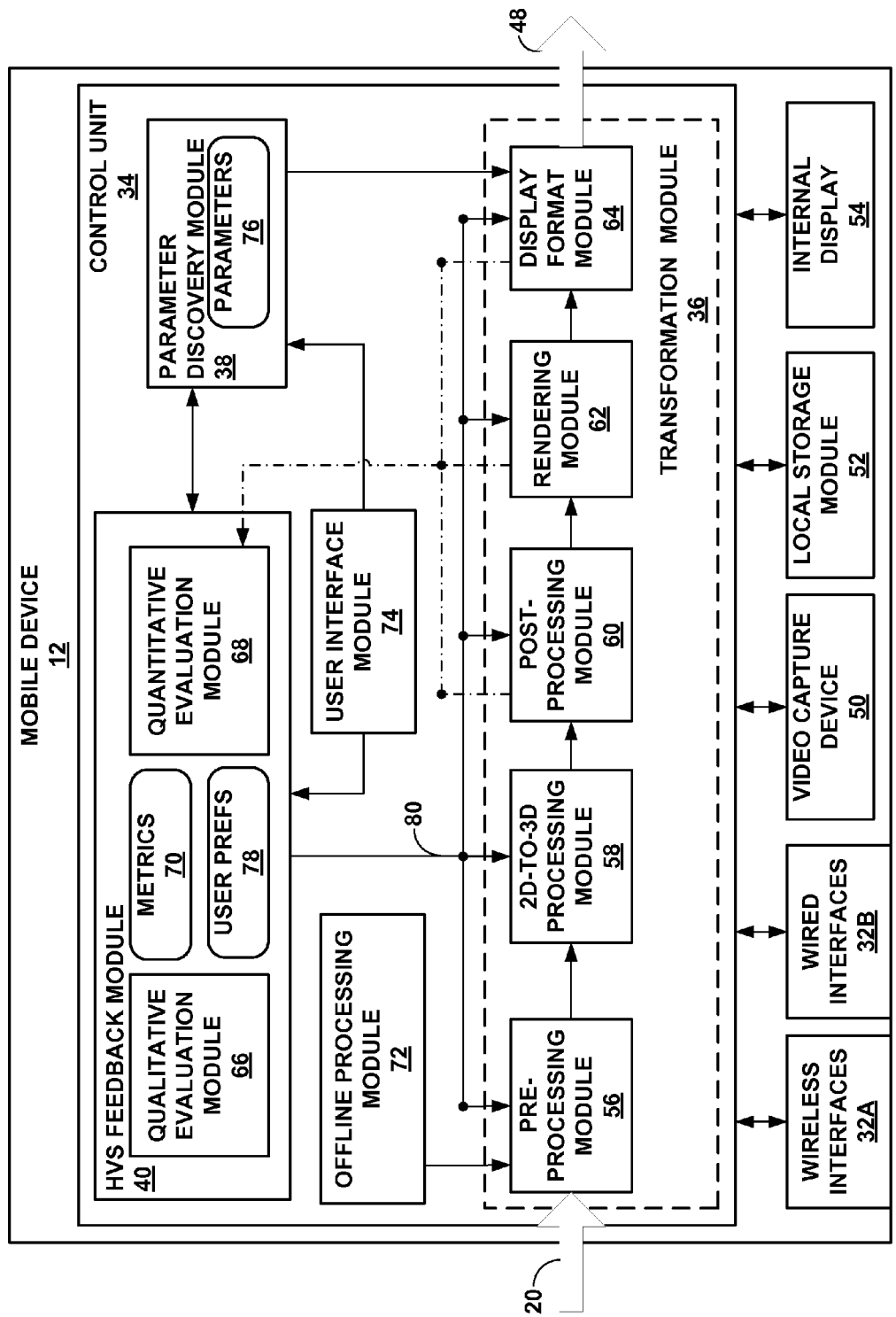
FIG. 2 is a block diagram illustrating the mobile device of FIG. 1 in more detail.

FIG. 2 is a block diagram illustrating an example of mobile device 12 of FIG. 1 in more detail. In the example of FIG. 2, mobile device 12 includes a plurality of interfaces 32, such as wireless interfaces 32A and wired interfaces 32B. Wireless interfaces 32A may comprise one or more of a wireless Internet interface (such as an interface defined by IEEE 802.11x suite of standards), a Bluetooth™ wireless interface, a wireless HDMI interface, an infrared wireless interface, or any other interface by which wireless communication may occur. Wired interfaces 32B may include one or more of a universal serial bus (USB) interface, a micro USB interface, an HDMI interface, a composite cable interface, a coaxial cable interface, a video graphics array interface, or any other interface by which wired communication may occur.

Mobile device 12 also includes a video capture device 50, a local storage module 52 and an internal display 54. Video capture device 50 represents one or more hardware modules, some of which may execute software, that implement a stereoscopic 3D video camera for recording 3D video data or a 2D video camera for recording 2D video data. Local storage module 52 represents a hardware or combination of hardware and software module for storing locally data, including 2D and 3D video data, or if coded and formatted, content. Local storage module 52 may comprise static or dynamic memory and/or storage devices, such as any of those listed above with respect to control unit 34. Internal display 54 represents a hardware or combination of hardware and software module that presents video data and image data for consumption by a viewer of internal display 54. Internal display 54 may comprise any of the displays noted above with respect to display 30 of display device 16.

Each of video capture device 50, local storage module 52 and internal display 54 couple to control unit 34, which has been illustrated in further detail in FIG. 2. In the example of FIG. 2, control unit 34 comprises transformation module 36, parameter discovery module 38 and HVS feedback module 40, which is the same as shown with respect to FIG. 1. These modules 36-40, however, have been shown in further detail in the example of FIG. 2 to include a number of sub-modules and data. For example, transformation module 36 includes pre-processing module 56, 2D-to-3D processing module 58, post-processing module 60, rendering module 62 and display format module 64.

Figure 3:
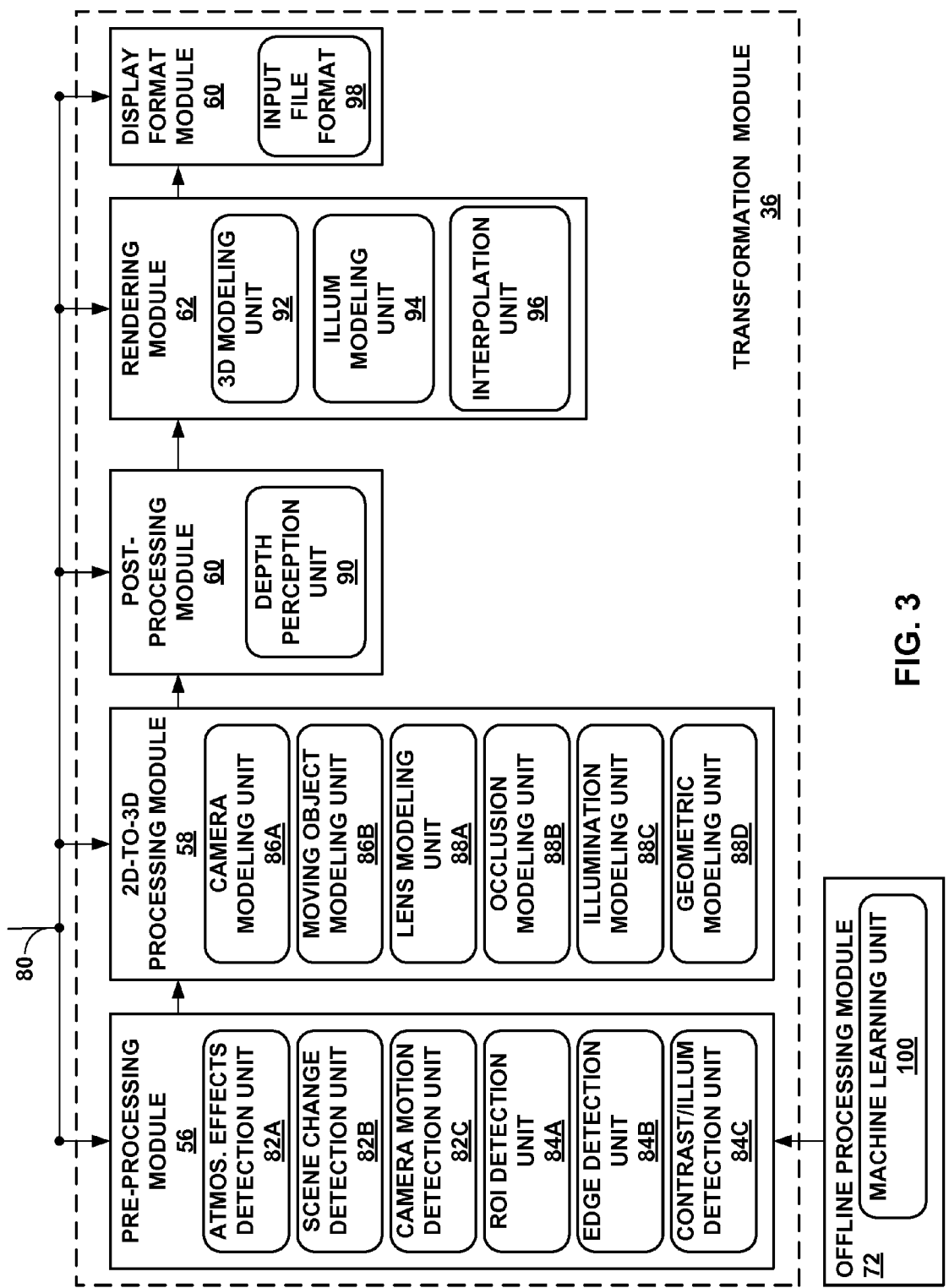
FIG. 3 is a block diagram illustrating a transformation module and an offline processing module of the mobile device of FIG. 2 in more detail.

While each of these modules are described in greater detail with respect to FIG. 3, briefly, pre-processing module 56 represents one or more hardware modules, some of which may execute software, that perform pre-processing to determine information for performing conversion of video data from one platform to another platform. 2D-to-3D processing module 58 represents one or more hardware modules, some of which may execute software, for performing, as the name suggests, conversion of 2D video data to 3D video data based on the information determined by pre-processing module 56, where this information may be referred to as "pre-processing information." Post-processing module 60 represents one or more hardware modules, some of which may execute software, that modify or otherwise adjust the generated 3D video data, such as a depth map, to refine the quality of 3D video playback. Rendering module 62 represents one or more hardware modules, some of which may execute software, that model 3D scenes, generate additional views and otherwise further refine the 3D video playback. Display format module 64 represents one or more hardware modules, some of which may execute software, that format the generated and subsequently refined 3D video data according to a given file format.

As another example, HVS feedback module 40 may include a qualitative evaluation module 66 and a quantitative evaluation module 68. Qualitative evaluation module 66 represents one or more hardware modules, some of which may execute software, that performs qualitative analysis of 3D video data 44 decoded by a display device external from mobile device 12, such as video decoder 28 of external display device 16, to determine one or more of metrics 70 that define, in part, a perceived quality of a quality of 3D visualization of 3D video data 44 with respect to a human visual system. Quantitative evaluation module 68 performs a quantitative analysis of 3D video data generated by various sub-modules of transformation module 36, such as post processing module 60, rendering module 62 and display format module 64. This analysis may result in determining additional ones of metrics 70. These metrics 70 may then form the basis for subsequent modification or re-configuration of one or more of modules 56-64 that form transformation module 36 to refine 3D video content 48 generated by transformation module 36. This refinement may lead to improved playback of 3D video data 44 in terms of both qualitative and quantitative metrics 70.

Control unit 34 also includes two additional modules, an offline processing module 72 and a user interface module 74, not previously shown with respect to the example of FIG. 1. Offline processing module 72 represents one or more hardware modules, some of which may execute software, that generally perform statistical analysis and modeling of descriptors of images (or video frames) with respect to properties, such as a type and direction of illumination, object reflectance, texture effects and atmospheric effects. These descriptors may comprise descriptors that comply with an MPEG-7 standard, sometimes referred to as Multimedia Content Description Interface, that defines a standard for multimedia content descriptors. In any event, descriptors may generally represent data defining descriptions of the visual features depicted by video data. Often, descriptors describe elementary characteristics of these visual features, such as the shape, color, texture or motion associated with these features.

User interface module 74 represents one or more hardware modules or a combination of hardware and software modules that present a user interface with which an operator of mobile device 12 interacts to input and receive data from mobile device 12. Often, user interface module 74 presents a graphical user interface (GUI) to internal display 54, which may provide the GUI to the user. In some instances, internal display 54 may comprise a so-called "touch screen" by which a user may interact with internal display 54 to input data defining selections of various items presented by the GUI. In this sense, internal display 54 may be considered as a part of user interface module 74 contrary to the exemplary depiction of internal display 54 separate from user interface module 74 in the example of FIG. 2.

Initially, an operator of mobile device 12 may interface with a user interface presented by user interface module 74 to select one or more sources that includes video content that the operator desires to display via one or more destination displays. These sources may include video capture device 50 and local storage module 52 as well as source devices communicatively coupled to mobile device 12 via wireless and wired interfaces 32A, 32B ("interfaces 32"), such as source device 14 shown in the example of FIG. 1, which is communicatively coupled to interfaces 32 via wireless communication channel 13. Destination displays may comprise internal display 54 and one or more destination display devices communicatively coupled to interfaces 32, such as destination display device 16 shown in the example of FIG. 1 that is communicatively coupled to interfaces 32 via wireless communication channel 15.

After selecting one or more sources, the operator may also interface with this or another user interface presented by user interface module 74 to select the particular content stored by the selected source. For example, the operator may select source device 12 as the source of video content. In response, user interface module 74 may interface with source device 12 to determine content 20 and 22 stored by source device 14 within storage module 18. User interface module 74 may then update the current user interface or present another user interface by which to display content 20, 22 available for playback by a destination. The operator may interact with the presented user interface to select one or more of 2D video content 20 and 3D video content 22. It is assumed for purposes of illustration that the operator selects 2D video content 20.

After selecting 2D video content 20, the operator may interface with the current user interface, a previous user interface or another user interface to select one or more destinations. Again, for purposes of illustration, it is assumed that the operator interacts with this destination user interface to input data selecting display device 16. Upon selecting display device 16 as the destination for the selected 2D video content 20 stored by source device 14 to storage module 18, user interface module 74 receives this data indicating the selections and instructs the appropriate interfaces 32 to begin the receipt selected 2D video content 20 and transfer of 3D video content 48 generated through the transformation of 2D video content 20 by transformation module 36. User interface module 74 may also interface with parameter discovery module 38 to indicate the selected destination to parameter discovery module 38 so that parameter discovery module 38 may interface with the appropriate destination to determine parameters 76 in accordance with the techniques described in this disclosure.

The operator of mobile device 12 may also interface with a previous, current, or possibly a different user interface presented by user interface module 74 to input data specifying one or more user preferences 78 ("user prefs 78"). User preferences 78 may include a dominate eye preference, a contrast preference, a sharpness preference, a color hue preference, a color temperature preference, or any other preference related to display of video data. User preferences 78 may also include audio preferences, such as a surround sound preference and volume preference, and the techniques should not be limited to video-only user preferences. User interface module 74 forwards these user preferences 78 to HVS feedback module 40, which may employ these preferences 78 when configuring or re-configuring transformation module 36 in accordance with the techniques described in this disclosure.

In any event, after selecting source device 12 and destination display device 16 and potentially one or more of content 20 and 22 stored to source device 12, parameter discovery module 38 may interface with the selected destination, e.g., display device 16, to determine parameters 76. Parameter discovery module 76 may, for example, interface with display device 16 via a wired interface 32 that complies with the HDMI standard noted. Using various aspects of the HDMI standard, parameter discovery module 76 may determine parameters 76, such as an input file format supported by file format module 27 for receiving 3D video content. Other parameters 76 include those noted above related to various capabilities or parameters of display 30, such as supported resolutions, current resolution, display size, supported color temperatures, current color temperature, or any other parameter related to display 30 and video decoding, including codecs supported by video decoder 28.

As described in more detail below, parameter discovery module 38 may also be characterized as a wireless display (WD) host that hosts a session by which these parameters are discovered wirelessly. Often, when implementing these wireless display host techniques, parameter discovery module 38 implements a form of HDMI referred to as "wireless HDMI" or "WHDMI."

After discovering parameters 76, parameter discovery module 38 may interface with display format module 64 of transformation module 36 to configure display format module 64 so as to properly format 3D video data in accordance with a file format supported by file format module 27 of selected destination display device 16. Parameter discovery module 38 may perform both the discovery of parameters 76 (which includes the input file format) and the configuration of display format module 64 automatically.

Use of the term "automatically" as noted above typically indicates that no operator intervention is required to perform those actions denoted as occurring automatically. Use of this term, however, is not meant to suggest that the operator or user input may not be required to initiate the noted automatic operations. To illustrate, consider the above example in which the operator interacts with the various user interfaces to select a source, content and a device. The interaction with the user interfaces does not detract from the automatic nature of determining parameters 76 and display format module 64. The operator may be unaware of these automatic operations as the user, in the above example, is not required to provide any input or data specifying that parameter discovery module 38 determine these parameters 76 and then configure display format module 64. In this respect, automatic operations may be construed to occur transparently from the operator's perspective inasmuch that the operator has not actively indicated that these operations are to be performed.

Parameter discovery module 38 may configure display format module 64 via an application programming interface (API) call by which parameter discovery module 38 may specify the determined input file format of display device 16. Prior to receiving 2D video content 20, HVS feedback module 40 may also interface with pre-processing module 56, 2D-to-3D processing module 58, post-processing module 60, rendering module 62 and display format module 64 to configure these modules 56-64 based on user preferences 78. For example, one of user preferences 78 may define a preferred sharpness, which HVS feedback module 40 may utilize when configuring 2D-to-3D processing module 58. HVS feedback module 40 may utilize the preferred sharpness as an indication of the accuracy at which 2D-to-3D processing module 58 computes depth values at sharp image discontinuities. In another example, one of user preferences 78 may define a preferred location of the convergence plane or a preferred depth range, which HVS feedback module 40 may utilize when configuring rendering module 62. HVS feedback module 40 may utilize the preferred convergence plane location or depth range to adjust the rendering parameters of module 62.

In any event, both parameter discovery module 38 and HVS feedback module 40 may configure one or more of modules 56-64 of transformation module 36. Once configured, transformation module 36 may receive 2D video content 20, which may comprise single view or multi-view 2D video data. Single view 2D video data may comprise a single view shot from a single video capture device. Multi-view 2D video data may comprise multiple views shot from multiple video capture devices. Typically, multi-view 2D video data enables playback of any one of the multiple views and often the viewer can switch between the multiple views during playback, however, a 2D display device typically does not present two or more of the multiple views simultaneous to one another.

Pre-processing module 56 typically receives 2D video content 20. Offline processing module 72 does not receive the 2D video content but rather supports pre-processing module 56 in the manner described below with respect to FIG. 3. Briefly, offline processing module 72 typically implements various algorithms by which to, as noted above, perform statistical analysis and modeling to generate models for use by pre-processing module 56.

Pre-processing module 56 receives 2D video content 20 and determines global information concerning the various images or frames that form 2D video content 20. This global information may pertain to a single image or frame or several images or frames of 2D video content 20. For example, the global information may define atmospheric effects (e.g., information indicating the presence of rain, snow, wind, etc.). Pre-processing module 56 may also determine local information for a given image or frame of 2D video content. Such local processing to determine the local information may involve determining information relating to the location and intensity of edges, classification of edges, segmentation of objects, detection of illumination properties, and detection of regions of interest. After pre-processing and determining the global and local information, pre-processing module 56 forwards 2D video content 20 and the global and local information to 2D-to-3D processing module 58.

2D-to-3D processing module 58 processes the received 2D video content 20 to extract depth information. 2D-to-3D processing module 58 may extract depth information based on the global and local information determined by pre-processing module 56. For example, 2D-to-3D processing module 58 may extract depth information from geometric linear information, such as edge information defined by the information determined by pre-processing module 56. 2D-to-3D processing module 58 may implement a number of depth extraction algorithms to, for example, extract depth information or values from geometric structure and motion, focus/defocus, shading and shadow, and the above noted geometric linear information. 2D-to-3D processing module 58 may merge the depths extracted via one or more of these algorithms to generate a depth map. The depth map assigns a depth value to each pixel of every image or frame of 2D video content 20, thereby generating 3D video data, which it forwards to post-processing module 60.

Post-processing module 60 receives this 3D video data generated by 2D-to-3D processing module 58 and modifies the 3D video data to refine the depth map. For example, post processing module 60 may modify the depth map to improve a quality of visualization of the resulting transformed 3D video content 48 when displayed via display device 16. This modification may involve globally smoothing the depth map or selectively modifying the depth information for certain regions of interest in a frame that corresponds to the depth map. After refining the depth map in this manner, post-processing module 60 forwards the refined 3D video data to rendering module 62.

Rendering module 62 receives the refined 3D video data and models 3D scenes for instances where one or more views are required, such as is the case when the determined input format for display device 16 is a multi-view streams format or where display device 16 otherwise supports multiple 2D-plus-depth (z) views. After this view rendering, rendering module 62 forwards the potentially multi-view 3D video data to display format module 64, which proceeds to format the multi-view 3D video data in accordance with the configured input file format supported by display device 16 to generate transformed 3D video content 48. Display format module 64 then forwards transformed 3D video content 48 to display device 16 for presentation to a viewer.

While transforming 2D video content 20 in the manner described above, HVS feedback module 40 interfaces with display device 16 to retrieve 3D video data 44 output by video decoder 28 of display device 16. HVS feedback module 40 then performs qualitative and quantitative evaluation of decoded 3D video data 44. More specifically, qualitative evaluation module 66 performs the qualitative evaluation related to a quality of visualization of decoded 3D video data 44 to determine one or more of metrics 70 (which may be referred to as "qualitative metrics 70"). This quality of visualization may also include comfort of a given viewer (as defined by user preferences 78) when viewing 3D video data 44. To illustrate, consider that a right-eye dominant viewer favors his right-eye when viewing 3D video data 44. In this case, qualitative evaluation module 66 may analyze 3D video data 44 to ensure that the right-eye stream is favored over a left-eye stream. That is, if the viewer is right-eye dominant, qualitative evaluation module 66 may weight right-eye stream metrics over left-eye stream metrics when determining an overall metric for a given frame or group of pictures.

Quantitative evaluation module 68 may perform quantitative analysis of 3D video data 44 to determine one or more of metrics 78 (which may be referred to as "quantitative metrics 78"). For example, quantitative evaluation module 68 may evaluate a relationship between a depth and a size of an object in one or more frames of 3D video data generated by one or more of post processing module 60, rendering module 62 and display format module 64. Quantitative metrics 78 may include this relationship between the depth and size of the object as one metric. Other quantitative metrics 78 may include those related to depth image based rendering, such as a filter efficacy metric, a visible discontinuity metric, and an interpolation efficacy metric. Quantitative metrics 78 may also include those useful in normalization of depth. Quantitative metrics 78 may therefore include at least one metric related to a relationship between a depth and a size of an object defined by the 3D video data, a relationship between a depth discontinuity and a mean region color discontinuity of the 3D video data, a filter efficacy metric, an interpolation efficacy metric, metrics useful in normalization of depth, and metrics related to measuring discontinuities of depth along time. Qualitative evaluation module 68 may further measure discontinuities of depth along time of the video data generated by modules 60-64, as well as, perform a wide number of other forms of quantitative analysis.

Using qualitative evaluation module 66 and/or quantitative evaluation module 68, HVS feedback module 40 may perform a wide array of analysis. This analysis may, as noted above in part, involve measuring and adjusting the relationship between depth and size of any object in a given frame or image of 3D video data either generated by one or more of modules 56-64 or received from display device 16 as 3D video data 44. The analysis may also involve measuring discontinuities of depth along time, shadow or shading effects, background contrast, and spatial frequency.

Based on these metrics, HVS feedback module 40 may then determine configuration data 80 based on metrics 70 and interface with one or more of modules 56-64 of transformation module 36 to re-configure these modules 56-64 so as to refine a perceived visual quality of transformed 3D video content 48. In addition to determining configuration data 80 on metrics 70, HVS feedback module 40 may also determine configuration data 80 based on parameters 76, which parameter discovery module 38 may forward to HVS feedback module 40. Moreover, HVS feedback module 40 may determine or otherwise tailor configuration data 80 to accommodate user preferences 78. Configuration data 80 may therefore be determined in accordance with a wide variety of metrics, parameters and preferences.

As one example, HVS feedback module 80 may tailor configuration data 80 to rectify focus cues for display devices that lack eye tracking functionality. Focus cues comprise data describing a clarity of an image across a given frame for different focal lengths. In this example, parameters 76 may indicate the lack of eye tracking functionality of display device 16. To rectify focus cues (which may comprise cues in 3D video content 48 by which the HVS interprets focus) in this context, HVS feedback module 40 may determine configuration data 80 for 2D-to-3D processing module 58 and/or rendering module 62 so as to constrain depth extraction performed by 2D-to-3D processing module 58 and/or constrain depth interpretation for multi-view rendering by rendering module 62.

HVS feedback module 40 may generate this configuration data 80 based on parameters 76 that indicate a size of display 30 of display device 16, as focus may depend on a field of view and standard viewing distance, both of which can be derived from the size of the display. Focus may also depend on eye separation (which is typically defined as the distance between the left and right eye) and user preferences 78 may store a standard eye separation preference. HVS feedback module 80 may therefore access both user preferences 78 and parameters 76 to generate configuration data 80 so as to rectify focus miscues in display device 30 having no eye tracking mechanism by which to provide the above feedback (e.g., actual viewing distance, actual eye position, and actual eye separation).

If eye tracking is available through display device 16, HVS feedback module 40 may receive this feedback via the same interface by which HVS feedback module 40 receives 3D video content 44. This mechanism may be an external device coupled to display device 16. Alternatively, this eye tracking mechanism may be integrated within display device 16. The name "eye tracking" may be a misnomer in some examples as the mechanism need not track eye movements but may more generally track a position of each user, in which case viewing distance and eye position may be derived.

In some instances, HVS feedback module 40 may generate configuration data 80 to rectify focus cues differently for stereoscopic and auto-stereoscopic displays. Whether a display device 16 is stereoscopic (a display device that requires additional viewing apparatus to properly present 3D video data, such as shutter glasses) or auto-stereoscopic (a display device that does not require additional viewing apparatus to properly present 3D video data) may be determined by parameter discovery module 38 and stored as one of parameters 38.

Consider a specific type of auto-stereoscopic display referred to as a "volumetric display" (which again may be indicated via one of parameters 38). A volumetric display may be incapable of presenting a true light field for multiple simultaneous viewpoints (where each viewpoint is for a different viewer). As a result, these volumetric displays usually cannot correctly present view-dependent lighting (such as occlusions, specularities, and reflections) when used as auto-stereoscopic displays. HVS feedback module 40 may configure various modules 56-64 of transformation module 36 to correct a viewing position so as to improve stereo perception for a volumetric display.

Other differences between stereoscopic and auto-stereoscopic displays may warrant different configurations and HVS feedback module 40 may tailor configuration data 80 based on these parameters 78. For example, there are usually differences in depth perception and depth performance between auto-stereoscopic and stereoscopic displays. HVS feedback module 40 may tailor configuration data 80 differently based on these device capabilities or parameter differences.

As noted above, HVS feedback module 40 may tailor configuration data 80 to constrain focus cues based on different form factors of display device 18, and more particularly the size of display 30. Internal display 54 is usually of a much smaller form factor than display 30 of external display device 16, and these different form factors may imply differences in how stereo images are built and displayed. Moreover, the form factor may indicate a potential size of a viewing audience, where smaller form factors may suggest a single viewer, while larger displays may suggest multiple viewers. HVS feedback module 40 may generate configuration data 80 so as to account for these different form factors.

Specifically, HVS feedback module 40 may, in one example, leverage aspects known of the HVS to generate configuration data 80 based on the form factor. In one aspect, optimal voxel distribution is dictated by the spatial and focus resolutions of the human eye. Given this known limitation of the human eye, HVS feedback module 40 determines specific spatial and focus resolutions based on the type of display (stereoscopic or auto-stereoscopic including different subclasses of these two types of 3D display technologies) and size of the display. HVS feedback module 40 may then generate configuration data 80 for 2D-to-3D processing module 56 to modify depth processing.

HVS feedback module 40 may also refine or potentially optimize spatial frequency as indicated by one of metrics 70 based on a particular visual axis or viewing angle of the viewer with respect to display device 16. This visual axis or viewing angle may be provided with 3D visual data 44 or parameter discovery module 38 may interface with display device 16 to discover this visual axis or viewing angle as one of parameters 76 (in that it relates to an eye or viewer tracking apparatus integrated within display device 16). HVS feedback module 40 may also utilize one or more of parameters 76 specifying a current display resolution, as this display resolution may impact focus cues. HVS feedback module 40 may then generate configuration data 80 based on these parameters 76.

In another example, HVS feedback module 40 may generate configuration data 80 to refine or potentially optimize depth image based rendering (DIBR). HVS feedback module 40 may analyze 3D video data 44 and 3D video data generated by post-processing module 60, rendering module 62 and display format module 64 to refine various aspects of DIBR. In one instance, HVS feedback module 40 analyzes this video data 44 or that generated by one or more of modules 60-64 to ensure proper filtering in the depth dimension to minimize, and possibly potentially eliminate visual artifacts. Often, depth filtering refinement revolves around a particular display technology or capability, which again is discoverable by parameter discovery module 38 and therefore known via one or more of parameters 76. To illustrate, consider that visible discontinuities due to non-depth-filtered rendering are potentially much greater in subtractive displays because these displays may make visible direct illumination from a back-light. HVS feedback module 40 may therefore generate configuration data 80 to adjust depth filtering so as to account for different display capabilities.

HVS feedback module 40 may also generate configuration data 80 to refine various aspects of DIBR based on metrics 70 related to filtering for the purpose of filling holes (e.g., interpolation, which may arise when adjust resolutions of 2D video content 20 to accommodate the current resolution). The filtering may comprise Gaussian filtering or edge-based filtering. HVS feedback module 40 may also generate configuration data 80 to refine DIBR based on metrics 70 related to particular file formats, such as a file format referred to as P3D, so as to force a depth value for particular pixels to zero where occlusions are expected to occur in a given image or frame.

Also with respect to refining DIBR, HVS feedback module 40 may generate configuration data 80 based on metrics 70 related to shadow effects and shading so as to increase shadow effects/shading in regions using visible neighbor pixels. HVS feedback module 40 may also augment edges to refine DIBR through high-frequency enhancement (HFE) to minimize blurring due to depth filtering which tends to smooth out edge discontinuities. Additionally, HVS feedback module 40 may refine DIBR by generating configuration data 80 to facilitate dynamic range reshaping of depth maps whereby this configuration data 80 expands higher depth values and compress lower depth values. In some instances, HVS feedback module 40 may modulate the range of expansion and compression based on perceptibility or sensitivity of a given viewer's HVS as defined by one of user preferences 78.

This DIBR refinement may also occur by way of HVS feedback module 40 generating configuration data 80 that adjusts DIBR based on one or more of user preferences 78 related to eye preference or dominance. To illustrate, consider that for any one view, a viewer may be left- or right-eye dominant and the viewer may indicate this dominance as one of user preferences 78. Notably, the viewer may undergo a test presented via a user interface to determine dominance or may merely select the dominance. In any event, HVS feedback module 40 may generate configuration data 80 that adjusts the various views based on those of user preferences 78 related to eye dominance, sensitivity or perceivability difference such that views are fined for +/−20 degrees or up to 50 degrees along visual axis for good voxel resolution of up to 120 color pixel density (cpd). Where appropriate, HVS feedback module 40 may generate configuration data 80 to adopt an asymmetric quality so as to improve depth perception, where this asymmetric quality denotes that a perceived quality of left- and right-eye view are asymmetric or not equal.

In yet another example, HVS feedback module 40 may generate configuration data 80 to normalize depth based on one or more of user preferences 78 related to eye sensitivity, as well as, metrics 70 related to content type, illumination level and the like. Normalization of depth by HVS feedback module 40 may also depend on a max depth, which is determined based on video data 44 and metrics 70 related to scene changes, content type and constitution (e.g., if there are objects that are at infinite focal length). Normalization of depth by HVS feedback module 40 may also depend on parameters 76, such as a display type, in addition to quantitative metrics 70 related to a rendering method.

In another example, HVS feedback module 40 may generate configuration data 80 to refine 3D visualization so as to minimize stress (e.g., eye fatigue and nausea). In some aspects, HVS feedback module 40 may generate configuration data 80 to optimize 3D visualization so as to minimize stress (e.g., eye fatigue and nausea). HVS feedback module 40 may constrain depth to minimize stress, perform selective depth extraction based on type of objects in the scene, perform selective depth rendering for specific depth extraction for specific object of interest in the scene, or only extract depth values above a certain confidence level. In this manner, HVS feedback module 40 may generate configuration data 40 based on metrics 70, parameters 76 and user preferences 78 and re-configure one or more modules 56-64 of transformation module 36 so as to refine, if not possibly improve or even optimize, transformation of 2D video content 20 to 3D video content 48.

Re-configured modules 56-64 of transformation module 36 may then continue to transform 2D video content 20 into 3D video content 48 in accordance with configuration data 80. Transformation module 36 may then begin to forward refined 3D video content 48 to display device 16 after this dynamic reconfiguration, whereupon display device 16 may present this refined 3D video content 48 via display 30 for consumption by one or more viewers. This feedback mechanism in which HVS feedback module 40 may continue during the entire transformation of 2D video content 20 to 3D video content 48 so as to continually refine or, in some aspects optimize, this video data for playback on the particular platform selected by the operator, e.g., display device 16. In this respect, HVS feedback module 40 may enable transparent (form the viewers perspective) real-time or near real-time dynamic feedback that refines, and potentially improves if not optimizes, 3D video content 48 in a manner that tailors 3D video content 48 for playback on a specifically selected display device, e.g., display device 16, to a particular viewer, as defined by user preferences 78. Set forth below is an example in which HVS feedback module 40 generates configuration data 80 and reconfigures various ones of modules 56-64 of transformation module 36 in accordance with configuration data 80. HVS feedback module 40 may also enable transparent (form the viewers perspective) real-time or near real-time dynamic feedback that can be used to re-configure modules 56-64 such that computational complexity is reduced while preserving an acceptable 3D video quality according to user preferences.

FIG. 3 is a block diagram illustrating transformation module 38 and offline processing module 72 of mobile device 12 of FIG. 2 in more detail. As shown in the example of FIG. 3, each of modules 56-62 comprise additional units that perform various aspects of the transformation of 2D or 3D video content to transformed 3D video content 48. For example, pre-processing module 56 comprises at least three global processing units 82A-82C, which are shown in the example of FIG. 3 as atmospheric effects detection unit 82A ("atmos effects detection unit 82A"), scene change detection unit 82B, and camera motion detection unit 82C. These are considered global processing units as they analyze globally an entire frame or multiple frames of 2D video content 20, for example, to detect respective atmospheric effects, scene changes and camera motion.

Pre-processing module 56 also include local processing units 84A-84C that process input video data 20 or 22 for a given region of neighboring pixels within a single frame at a time (which is considered localized or local processing) to detect regions of interest (ROI), edges and contrast and/or illumination, respectively. In the example of FIG. 3, these local processing units 84A-84C are shown as ROI detection unit 84A, edge detection unit 84B and contrast/illumination detection unit 84C ("contrast/illum detection unit 84C"). ROI detection unit 84A represents one or more hardware modules, some of which may execute software, that detect ROI, such as faces or human bodies. Edge detection unit 84B represents one or more hardware modules, some of which may execute software, that locates and classifies edges, e.g., classifying edges as bounding real objects, as defining shadows boundaries, or as defining shading effects. This classification may also involve determining an intensity of edges. Contrast/illumination detection unit 84C represents one or more hardware modules, some of which may execute software, that detect illumination properties.

While not shown in FIG. 3 for ease of illustration purposes, pre-processing module 56 may include additional global or local processing units. For example, pre-processing module 56 may include another local processing unit that performs segmentation of objects based on chroma components of a given image or frame, the color components of the image or frame or both the chroma and color components of the image or frame. The techniques set forth in this disclosure should therefore not be limited to the example shown in FIG. 3, but may include additional global and local processing units. The various information extracted by units 82A-82C and 84A-84C may be forwarded to 2D-to-3D processing to facilitate depth extraction.

2D-to-3D processing module 58 includes a number of units to perform both multi-frame and single-frame depth extraction techniques. Multi-frame depth extraction units include camera modeling unit 86A and moving object modeling unit 86B. Camera modeling unit 86A represents one or more hardware modules, some of which may execute software, that models geometric structure and motion (e.g., models a camera capturing geometric structure and motion) to extract depth values. Moving object modeling unit 86B represents one or more hardware modules, some of which may execute software, that segment a background from independent moving objects to extract depth values.

Single-frame extraction units include lens modeling unit 88A, occlusion modeling unit 88B, illumination modeling unit 88C and geometric modeling unit 88D. Lens modeling unit 88A represents one or more hardware modules, some of which may execute software, that extract depth values based on focus and defocus cues detected in a given frame or image. Occlusion modeling unit 88B represents one or more hardware modules, some of which may execute software, that model or otherwise detect occlusions between various objects in a given frame or image and extracts depth values based on these occlusions. Illumination modeling unit 88C represents one or more hardware modules, some of which may execute software, that extract depth values for a single frame or image based on detected shadows and shading effects. Geometric modeling unit 88D represents one or more hardware modules, some of which may execute software, that extract depth values for a single frame or image based on modeling of geometric linear perspectives within the single frame or image.

As noted above, many of these units 86A-86B and 88A-88D rely on information extracted by units 82A-82C and 84A-84C of pre-processing module 56. For example, illumination modeling unit 88C may base the extraction of depth on contrast/illumination information determined by contract/illumination detection unit 84C and edge detection unit 84B. As another example, occlusion modeling unit 88B may model occlusions using edge information detected by edge detection unit 84B. As yet another example, lens modeling unit 88A may base depth extraction on edge information determined by edge detection unit 84B. As a further example, geometric modeling unit 88D may extract depth values based on edge information determined by edge detection unit 84B. Camera modeling unit 86A and moving object modeling unit 86B may extract depth values based on information determined by atmospheric effects detection unit 82A, scene change detection unit 82B and camera motion detection unit 82C. In this manner, 2D-to-3D processing module 58 may extract depth values from both 2D and 3D video content 20 and 22.

Notably, for multi-view streams, transformation module 36 may include multiple 2D-to-3D processing module (e.g., multiple 2D-to-3D processing modules may be invoked) to process each frame of a different stream that was acquired or captured at the same time from multiple capture systems. Even for single-view streams, transformation module 36 may comprise multiple 2D-to-3D processing modules by which to process two or more consecutive frames or images. In this single-view stream instance, each of the multiple 2D-to-3D processing modules will extract feature points and descriptors for these points. These descriptors will then be used to set the correspondence between the feature points in different frames, where the location of correspondent points will be used along with the projective geometry camera model implemented by camera modeling unit 86A to extract the depth values.

With respect to multi-view streams where each view has been acquired at the same time with different camera units (each camera located at a different point in space with the same or different camera parameters), 2D-to-3D processing unit 58 may include multiple cameras modeling units similar to lens modeling unit 88A. Each of these lens modeling units 88A process a frame of a different multi-view, where each of these frames are captured at the same time. For single-view streams, 2D-to-3D processing unit 58 may invoke camera modeling unit 88A to process a single image or frame of the single-view stream at a time.

After determining depth values using one or more of multi-frame processing units 86A-86B and single-frame processing units 88A-88D, 2D-to-3D processing module 58 may merge depth values or otherwise integrate these depth values from various multi-frame and single frame processing units 86A-86B and 88A-88D to create a composite depth map for each frame of a given view stream (or, in the case of multi-view streams, each of the view streams). The depth map assigns a depth value to each pixel of a given frame or image. With respect to the 2D-plus-depth file format, as one example, the depth map for each frame is represented as a grey-scale image, where each 8-bit pixel value of the grey-scale image defines a depth value for a corresponding pixel in the frame.

HVS feedback module 40 may generate configuration data 80 to configure 2D-to-3D processing module so as to constrain depth extraction by one or more of multi-frame and single-frame depth extraction processing units 86A-86B and 88A-88D. As one example, HVS feedback module 40 may generate configuration data 80 to configure camera modeling unit 86A such that linear system of equations used to model the camera system are disambiguated and sped up by using results from other units (e.g., units 86B and 88A-88D) to constrain a set of valid corresponding points.

HVS feedback module 40 may also generate configuration data 80 to affect the merge of depth maps generated by multi-frame and single-frame processing units 86A-86B and 88A-88D. For example, 2D-to-3D processing module 58 may merge these depth maps using a weighted average merge function that assigns a different weight to each of the determined or extracted depth maps. HVS feedback module 40 may generate configuration data 80 to modify or configure these weights to adjust the resulting composite depth map. This adjustment may improve the quality of visualization of transformed 3D video content 48 or otherwise reduce stress associated with viewing transformed 3D video content 48.

After processing 2D video content 20 in this manner, 2D-to-3D processing module 58 forwards 2D video content 20 and the generated one or more (as in the case of multi-view streams) composite depth maps to post-processing module 60. Post processing module 60 includes a depth perception unit 90 that modifies the resulting one or more depth maps to refine the quality of visualization of transformed 3D video content 48. In some instances, depth perception unit 90 modifies the resulting one or more depth maps to improve the quality of visualization of transformed 3D video content 48. Depth perception unit 90 may introduce a unit in a pipeline of modules 56-64 representative of transformation module 36 whereby HVS feedback module 40 may intercede to refine the depth maps. To illustrate, depth perception unit 90 may represent an interface with which HVS feedback module 40 may interact to load configuration data 80 such that HVS feedback module 40 may intercede in the pipeline to perform post-processing of depth maps.

In one example, HVS feedback module 40 may generate configuration data 80 for depth perception unit 90 so as to configure depth perception unit 90 to perform operations that globally smooth the depth map across multiple frames or the entire 3D video data and/or selectively modify depth information for certain regions of interest identified by ROI detection unit 84A. In another example, HVS feedback module 40 may generate configuration data 80 based on parameters 76 that configure depth perception unit 90 to perform operations that modify and constrain a range of depth values such that those values are tailored for the particular display, e.g., display device 16. In a further example, HVS feedback module 40 may generate configuration data 80 based on metrics 70 that configure depth perception unit 90 to perform operations that dynamically modify the depth maps to facilitate quantitative improvement of transformed 3D video data.

After refining the one or more depth maps, post-processing module 60 forwards the 2D video content and the one or more refined depth maps to rendering module 62. Rendering module 62 comprises a 3D modeling unit 92, an illumination modeling unit 94 ("illum modeling unit 94") and an interpolation unit 96. Each of 3D modeling unit 92, illumination modeling unit 94 and interpolation unit 96 represents one or more hardware modules, some of which may execute software, that model various aspects of 3D scenes so as to enable generation of one or more additional views from 2D video content 20.

3D modeling unit 92 may utilize depth maps from post processing module 60 to facilitate the generation of 3D scenes and subsequent generate of one or more additional views. Illumination modeling unit 94 may utilize illumination information determined by illumination modeling unit 88C and/or contrast/illumination detection unit 84C to facilitate the generation of 3D scenes and subsequent generate of one or more additional views. Interpolation unit 96 may utilize pixel information of the 2D video data to facilitate the generation of 3D scenes and subsequent generate of one or more additional views. In this respect, rendering module 62 generates additional views so as to enable generation of 3D video content in a multi-view stream format from single-view 2D video content 20.

Display format module 64, although not shown as comprising additional units similar to modules 56-62 for ease of illustration, may invoke various units to format the 3D video data received from rendering module 62 in accordance with an input file format 98 determined by parameter discovery module 38. In one example, display format module 64 invokes a color interleaving unit to interleave different views in different color components (as required, for example, by an anaglyph file format). As another example, display format module 62 invokes a spatial interleaving unit to interleave different views in different pixel location. When multiple view are generated, display format module 64 may invoke a multi-view unit that temporally multiplexes the various views for frame switched displays, which may be indicated by configuration data 80 and learned via one of parameters 76. In addition to display format requirements, HVS feedback module 40 may also generate configuration data 80 based on metrics 70 and/or user preferences 78 that configure display format module 64 to emphasize, filter, or generally modify the 3D video stream.

Offline processing module 72 may generally perform statistical analysis and modeling of certain descriptors of the various frames or images of a training set with respect to various properties of training set. The various properties may include a type and direction of illumination, object reflectance, texture and atmospheric effects. Offline processing module 72 provides support to pre-processing module by creating one or more models for use by the various units 82A-82C and 84A-84C of pre-processing module 56.

Offline processing module 72 includes a machine learning unit 100 to perform the statistical analysis and modeling.

Machine learning unit 100 may define and model a descriptor, as one example, that accounts for the variation in intensity across edges that are created due to shading or a descriptor, in another example, that accounts for the various in intensity across edges that are caused by a shadow. In a further example, machine learning unit 100 may define and model a descriptor that accounts for reflectance properties of an object in the scene under certain illumination conditions.

Machine learning unit 100 models the statistical behavior of each descriptor off-line using a training set (not shown in FIG. 3). This training set may consist of a set of images that are obtained under all potential variations of the properties that affect each descriptor. The model created by machine learning unit 100 after undergoing training using the training set therefore captures the probability of the descriptor to be a certain value for a given scenario condition (e.g., a given direction of the illumination). The model of the statistical behavior is then used online by the units of pre-processing module 56. Pre-processing module 56 utilizes these models to determine the maximum likelihood that, for a particular value for a given descriptor obtained from the one or more images or frames that pre-processing module 56 is currently processing, the conditions of the scenes be a particular one (e.g., a certain direction of illumination).

These models can be extended to not only illumination-related scenarios but also atmospheric effects in the scene (haze, rain, snow, etc.) or texture variations. The descriptors can also be local (if they capture information within a neighborhood of pixels) or global (if they capture information of the whole image). The models may capture statistical behavior of the relationship between several descriptors using Markov random fields. In this respect, offline processing module 72 may support pre-processing module 56 with machine learning unit 100 generating models for use by pre-processing module 56. Notably, machine learning unit 100 may receive new training sets that may enable improved modeling and subsequent transformations.

Figure 4A:
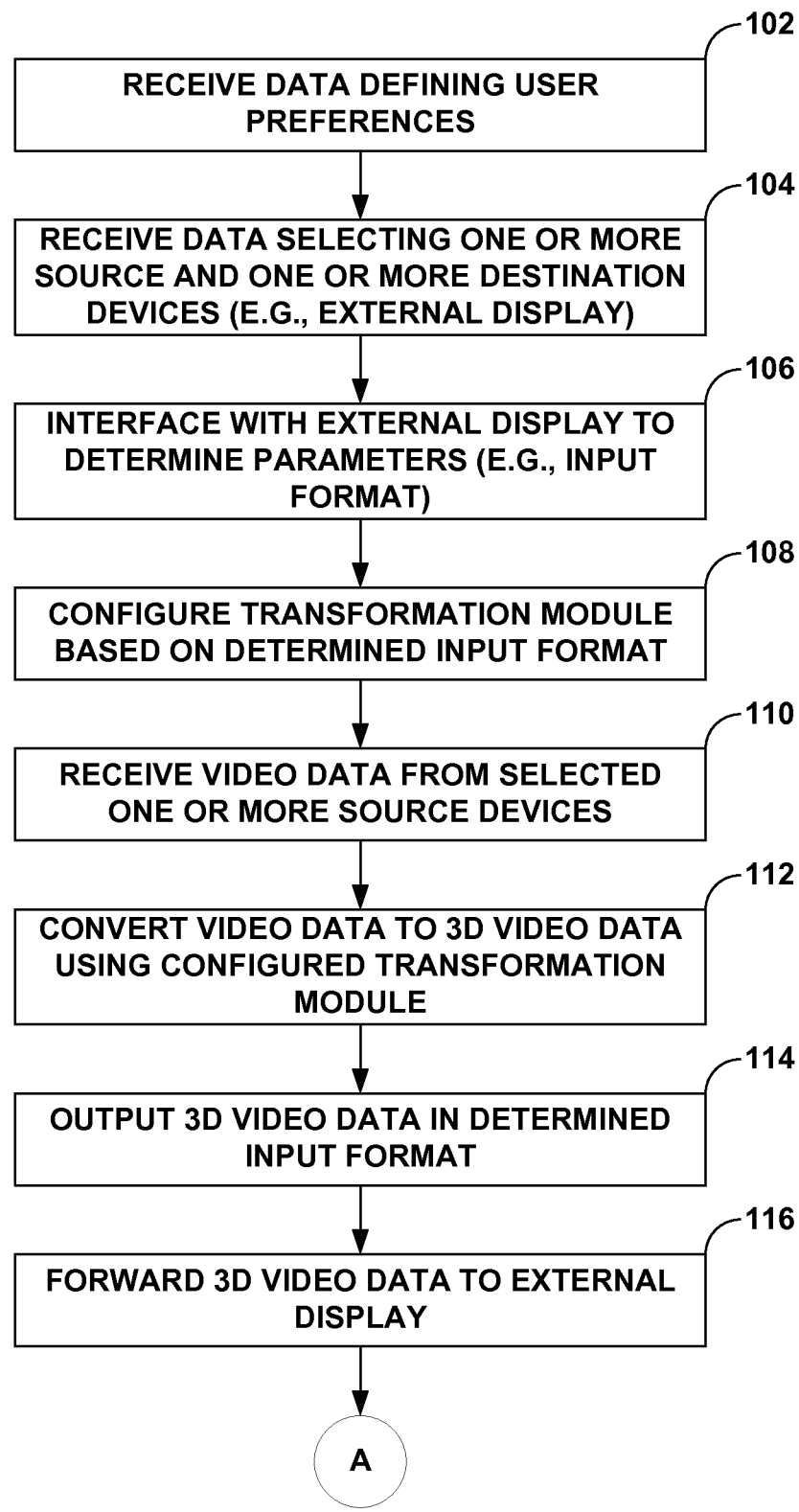
FIGS. 4A and 4B are flowcharts illustrating example operation of a device in implementing various aspects of the techniques described in this disclosure.
Figure 4B:
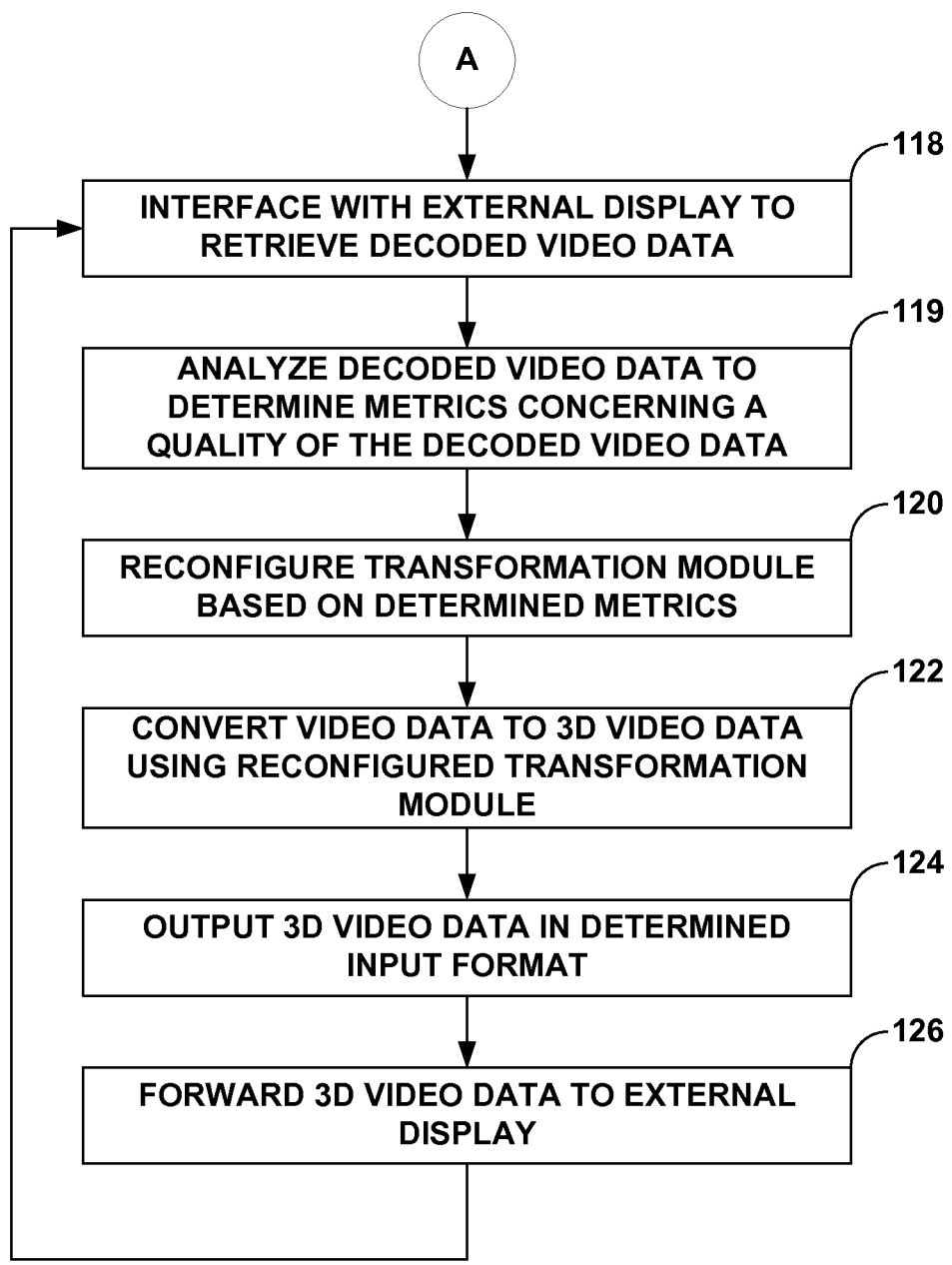

FIGS. 4A and 4B are flowcharts illustrating example operation of a mobile device, such as mobile device 12 of FIG. 2, in implementing various aspects of the techniques described in this disclosure. Referring first to FIG. 4A, a user interface module 74 included within control unit 34 of mobile device 12 may initially presents a user interface with which a user or other operator of mobile device 12 may interact to input data defining user preferences 78. User interface module 74 receives this data defining user preferences 78 and forwards user preferences 78 to HVS feedback module 40 for use in configuring or reconfiguring transformation module 36 (102).

User interface module 74 may also present the same or another user interface with which the user may interact to select one or more source devices and one or more destination devices. User interface module 74 may then receive data selecting one or more source devices (e.g., source device 14 shown in the example of FIG. 1) and one or more destination devices (e.g., external display device 16) (104). Based on these selection, user interface module 74 may interface with various ones of wireless interfaces 32A and wired interfaces 32B to establish communicative links or channels 13 and 15 with the selected one or more source devices, e.g., source device 14, and the selected one or more destination devices, e.g., external display device 16, respectively. After ensuring that these channels 13 and 15 are established, user interface module 74 may then interface with parameter discovery module 38 to initiate discovery of parameters 76 concerning the capabilities of display device 16.

Parameter discovery module 38 interfaces with display device 16 to determine parameters 76 via established communication channel 15 in the manner described above (106). Parameter discovery module 38 may forward these parameters 76 to HVS feedback module 40, which again may employ these parameters 76 when configuring or reconfiguring transformation module 36. One of parameters 76 may comprise one or more input file formats supported by external display device 16 to accept 2D and/or 3D video content. Parameter discovery module 38 may interface with transformation module 36 and, more specifically, display format module 64 to configure display format module 64 to format transformed 3D video data 48 in accordance with the determine input file format (108). Alternatively, HVS feedback module 40 may interface with display format module 64 to configure display format module 64 in the manner described above with respect to parameter discovery module 38. HVS feedback module 40 may also interface with other modules 56-62 to initially configure these modules 56-62 of transformation module 36 based on parameters 76 and user preferences 78 so as to tailor generation of 3D video content 48 for presentation by external display device 16 in accordance with user preferences 78.

Once configured, transformation module 36 interfaces with source device 12 via communication channel 13 to retrieve 2D and/or 3D video content 20, 22 from source device 12 (110). Upon receiving, for example, 2D video content 20, transformation module 36 converts the video data of 2D video content 20 to 3D video content 48, which is formatted in accordance with the determined input file format (112). Transformation module 36 then outputs 3D video data formatted in accordance with the determined input file format as 3D video content 48, which mobile device 12 forwards to display device 16 (114, 116).

Referring to FIG. 4B, after receiving at least a portion of 3D video content 48, display device 16 decapsulates received 3D video content 48 by removing the input file formatting headers to generate coded 3D video data 50. Display device 16 then decodes coded 3D video data 50 to generate 3D video data 44, which display device 16 presents via display 30 to one or more viewers for their consumption. While presenting this video data 44 and while transformation module 36 converts 2D video content 20 to 3D video content 48, HVS feedback module 40 interfaces with display device 16 to retrieve video data 44 (118).

As described above, HVS feedback module 40 and, more specifically, qualitative evaluation module 66 of HVS feedback module 40 analyze decoded video data 44 to determine qualitative metrics 70 as described above, where these qualitative metrics 70 describe a quality of visualization of decoded video data 44 (119). HVS feedback module 40 may also employ quantitative evaluation module 66 to determine quantitative metrics 70, which described in quantitative terms the quality of decoded video data 44. Based on these metrics 70, HVS feedback module 40 reconfigures modules 56-64 of transformation module 36 to refine the quality of visualization of decoded video data 44 (120).

HVS feedback module 40 may also base this reconfiguration of modules 56-64 on a combination of two or more of metrics 70, parameters 76 and user preferences 78. For example, given a particular one of user preferences 78 related to a user's preferred contrast level, HVS feedback module 40 may analyze metrics 78 (e.g., a perceived contrast level) in view of this preferred contrast level and generate configuration data that refines subsequent generation of 3D video content 48 such that video data 44 exhibits a contrast level that is near if not equal to the preferred contrast level. HVS feedback module 40 may also analyze metrics 78 in view of parameters 76 so as to refine generation of 3D video content 48 such that metrics 78 analyzes from subsequent video data 44 are improved with respect to the particular display capabilities defined by parameters 78. In some instances, all three of metrics 70, parameters 76 and user preferences 78 may be employed in the above manner to generate subsequent generation of 3D video content 48 that is refined with respect to metrics 70 given parameters 76 and user preferences 78.

After being reconfigured in the manner described above, transformation module 36 continues to convert 2D video content 20 to 3D video content 48 (122). Transformation module 36 then outputs 3D video content 48, which comprises 3D video data formatted in accordance with the determined input format (124). Mobile device 12 forwards 3D video content 48 to external display device 16 (126). The above process may continue in this manner in what may be characterized as an iterative process, such that for each of the iterations, video content 48 is refined with respect to metrics 70 that define a perceived quality of visualization of video data 44 (118-126).

While described above with respect to HVS feedback module 40 analyzing decoded 3D video data, HVS feedback module 40 may alternatively analyse coded 3D video data. Moreover, display device 16 may include its own HVS feedback module similar to HVS feedback module 40 that analyzes either coded or decoded 3D video data. In this way, display device 16 may analyze the 3D video data itself and forward the one or more metrics determined with its own HVS feedback module to HVS feedback module 40, which may use these metrics to adjust the transformation of video data to the 3D video data. The techniques therefore should not be limited in this respect.

Figure 5:
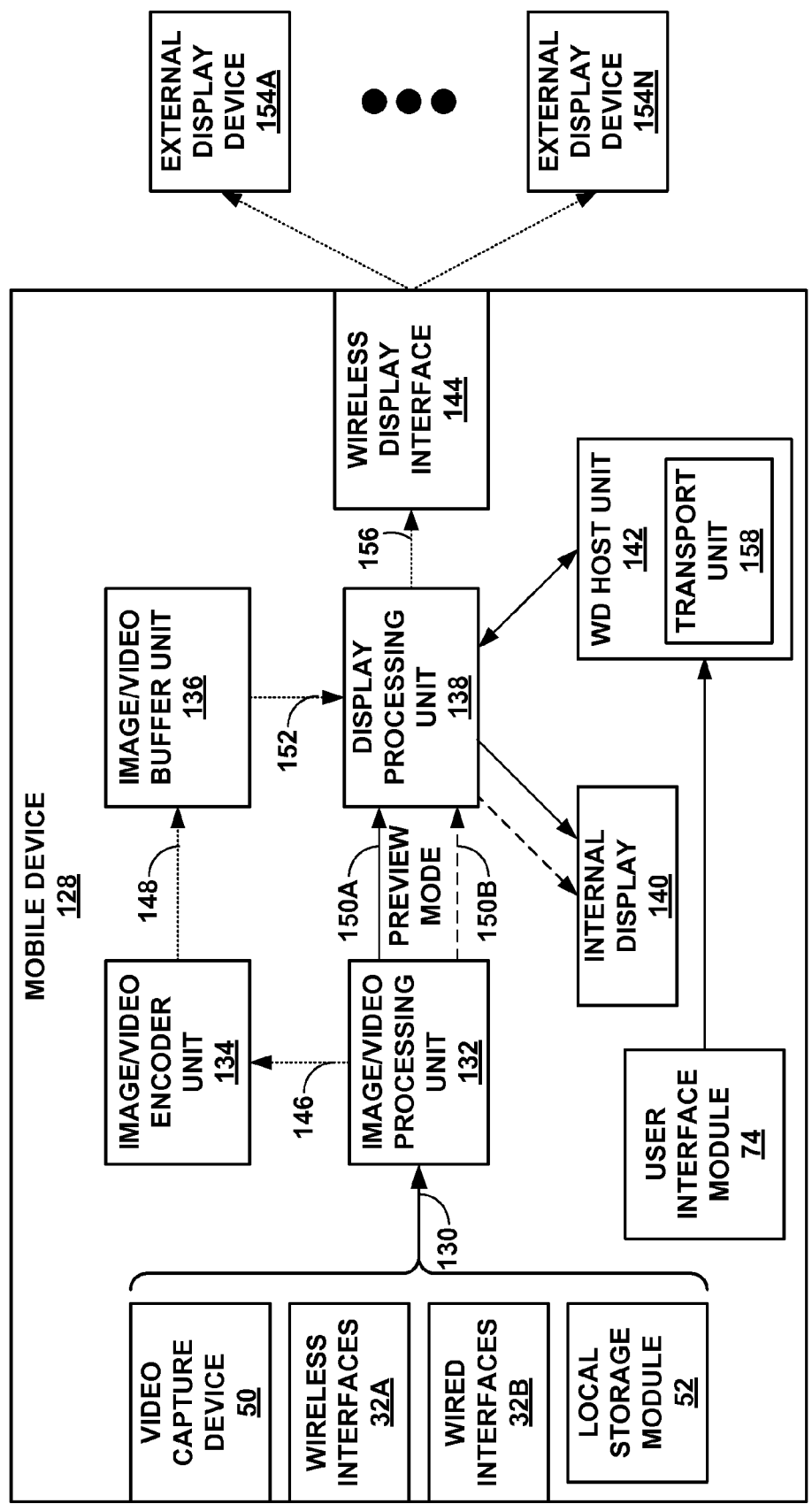
FIG. 5 is a block diagram illustrating an example device that implements various aspects of the techniques described in this disclosure.

FIG. 5 is a block diagram illustrating an example mobile device 128 that implements various aspects of the techniques described in this disclosure. Mobile device 128 may be substantially similar to mobile device 12 of FIG. 1. While described with respect to a particular device, e.g., mobile device 128, the techniques may be implemented by any type of device, including those other devices noted above as being able to implement the various aspects of the techniques described with respect to mobile device 12.

Similar to mobile device 12 shown in the example of FIG. 2, mobile device 128 includes wireless interfaces 32A, wired interfaces 32B, video capture module 50, local storage module 52 and user interface module 74. Each of wireless interfaces 32A, wired interfaces 32B, video capture module 50 and local storage module 52 may "source" (that is, provide) video data and/or content and, for this reason, may be referred to generally as "sources." These sources may provide video data 130, which may comprise 2D video data or 3D video data (which may include 2D video data plus additional depth information, or 2D video data plus additional depth and occluded areas information, or 2D video data plus depth, occluded areas and global effects information).

Mobile device 128 also includes an image/video processing unit 132, an image/video encoder unit 134, an image/video buffer unit 136, a display processing unit 138, an internal display 140, a wireless display (WD) host unit 142, and a wireless display interface 144. Image/video processor unit 132 represents a hardware unit or a combination hardware and software units that process video data 130 to generate 3D video data 146. Image/video encoder unit 134 represents a hardware unit or a combination of hardware and software units that encode video data 146 in accordance with one of one or more codecs supported by image/video encoder unit 134 to generate encoded video data 148. While shown as an encoder, image/video encoder unit 134 may also perform decoding. Encoder unit 134 outputs encoded video data 148, which is stored to image/video buffer unit 136, which may comprise memory or a storage device, such as the examples of both memory and storage devices described above.

In some instances, mobile device 128 provides a preview mode by which to preview 3D video data 146 locally on internal display 140, which may comprise a light emitting diode (LED) display, an organic LED (OLED) display, a cathode-ray tube display, a plasma display, a liquid crystal display (LCD) or any other type of display. In this preview mode, image/video processing unit 132 may generate preview video data 150A, 150B ("preview video data 150"). Preview video data 150A may comprise right-eye video data that forms the right eye perspective of 3D video data 146. Preview video data 150B may comprise left-eye video data that forms the left-eye perspective of 3D video data 146. When video capture device 50 comprises a 3D video capture device, this 3D video capture device 50 may produce both right-eye video data 150A and left-eye video data 150B, which image/video processing unit 132 may forward to display processing unit 138.

Display processing unit 138 represents a hardware unit or a combination of hardware and software units that processes buffered video data 152 to format buffered video data 152 in accordance with a input format supported by one or more of external display devices, such as one or more of external display devices 154A-154N ("external display devices 154"). Display processing unit 138 may output this formatted buffered video data 152 as 3D video content 156. Display processing unit 138 may include a display format interface (DFI), which is not shown in FIG. 5 for ease of illustration purposes, by which to determine the input file format supported by one or more of external display devices 154.

Display processing unit 138 may also receive one or more of preview video data 150 and format this preview video data 150 for presentation by internal display 140. Display processing unit 138 may output this formatted preview video data 150A, 150B as preview video content 158A, 158B ("preview video content 158"), one or both of which internal display 140 may present to a user of mobile device 128 simultaneous to outputting 3D video content 156 to one or more of external display devices 154.

In instances where internal display 140 supports 3D video content playback, preview video data 150 may comprise 3D video data that display processing unit 138 formats for display or presentation by internal display 140. In instances where internal display 140 supports both 3D video content and 2D video content playback, image/video processing unit 132 may determine whether to generate preview video data 150 as either 2D or 3D video data based on user preference, a type of application (e.g., 2D video data is often preferred for email/text while computer graphics (CG) is often rendered as 3D vide data), operating power mode, available battery power, and other preferences, metrics and parameters that typically influence decisions of this type.

Image/video processing unit 132, image/video encoder unit 134, and display processing unit 138 may comprise one or more of a processor, such as a general purpose processor (which may be referred to as a computer processing unit or CPU) that executes one or more instructions stored to a computer readable media, a digital signal processor (DSP), a graphics processing unit (GPU), or any other type of processor. Alternatively, image/video processing unit 132 may comprise dedicated hardware, such as a field programmable gate array (FPGA) and an application specific integrated circuit (ASIC). In some instances, both dedicated hardware and one or more processors may be combined to provide the various operations described in this disclosure with respect to units 132, 134 and 138.

While described above a formatting buffered video data 152 to generate 3D video content 156 in accordance with a input file format supported by external display devices 154, display processing unit 138 ordinarily only supports file formats for wired interfaces, such as HDMI, DVI, and other wired file formats. Particularly, display processing unit 138 may not support wireless file formats considering that there is not as of yet any formal or standardized wireless file format. WD host unit 142 may, however, support wireless display file formats and provide an interface to such wireless displays so as to determine whether one or more of external display devices 154 support wireless file formats. WD host unit 142 may therefore represent a hardware unit or a combination of hardware and software units that provide an interface by which to determine wireless display formats supported by one or more of external display device 154 and then format buffered 3D video data 152 in accordance with the determined wireless display formats. Consequently, WD host unit 142 may facilitate cross-platform playback by enabling mobile device 128 to wireless transmit 3D video content in accordance with a wireless file format supported by one or more external display devices 154.

WD host unit 142 may for example implement the WHDMI or WMDDI protocol described above to determine wireless display parameters, including the supported wireless file format, concerning the capabilities of those of external display devices 154 that comprise wireless displays. WD host unit 142 may receive buffered 3D video data 152 from display processing unit 138, format or reformat (in the case where display processing unit 138 initially formats this data) buffered 3d video data 152 in accordance with a determined one of the wireless input file formats, and returns the 3D video content 156 to display processing unit 138. Display processing unit 138 forwards this 3D video content 156 to wireless display interface 144, which may comprise one of wireless interfaces 32B but is shown separate for purposes of illustration. Wireless display interface 144 then forwards this 3D video content 156 to one or more of external display device 154.

While shown as included within mobile device 128, WD host unit 142 may reside external from mobile device 128 and interface with mobile device 128 via one of wireless interfaces 32A or wired interfaces 32B. When external from mobile device 128, WD host unit 142 may comprise a wireless display interface similar to wireless display interface 144 or another similar interface that facilitates communication with a WD client unit, which is described in more detail below. In some instances, WD host unit 142 may comprise a software module that is executed by display processing unit 138 so as to display processing unit 138 to perform wireless file formatting. To the extent display processing unit 138 includes hardware to execute WD host unit 142 in the above instance, WD host unit 142 may be considered to comprise both a hardware and software unit.

In some instances, WD host unit 142 may identify that two of the selected destination devices, e.g., external display devices 154, support different wireless file formats. In this instance, WD host unit 142 generates a first 3D video content 156 formatted in accordance with the first determined wireless file format and a second 3D video content 156 formatted in accordance with the second determined wireless file format. Wireless display interface 144 then forwards first and second 3D video content 156 to the appropriate ones of external display devices 154. Thus, although shown in the example of FIG. 5 as only sending a single 3D video content 156, that 3D video content 156 may comprise first and second version or, more generally, a plurality of versions of 3D video content 156, where each version is formatted in accordance with a different wireless file format.

One wireless format may comprise a format that leverages a transport protocol, such as a real-time transport protocol (RTP), to encapsulate a video data segment, an audio data segment and a depth data segment of 3D video content in a different one of a plurality of packets. Moreover, the format may leverage this transport protocol to encapsulate additional segments of information corresponding to occlusion information and/or global effects information, as shown below with respect to the example of FIG. 8. WD host unit 142 includes a transport unit 158 that implements this transport protocol to encapsulate the various segments of the 3D video content 156 in a different one of a plurality of packets. After encapsulating the various segments to different packets, transport unit 158 add metadata for enhancing playback of 3D video content 156 within an optional data field in a header of one of the plurality of packets. This metadata may define parameters that facilitate the rendering of additional views and that promote playback on particular displays. The metadata may also define user preferences, such as a desired contrast, sharpness, color temperature, 2D or 3D screen resolution, and 2D or 3D playback format (pillared box, stretch, original, etc.).

After formatting 3D video data 152 in accordance with this file format that involves the transport protocol, WD host unit 142 may forward the resulting 3D video content 156 to wireless display interface 144, which transmits the packets to one or more of external display devices 154. When wireless display interface 144 transmits this content 156 to two or more of external display devices 154, the transmission may be referred to as "WD multicasting" of 3D video content 156. In any event, this transmission may occur simultaneous to display of preview video data 150 via internal display 140. Often, presentation of preview video data 150 and 3D video content 156 is synchronized. Alternatively, presentation of preview video data 150 may occur before presentation of 3D video content 156 by one or more of external display devices 154.

Figure 6:
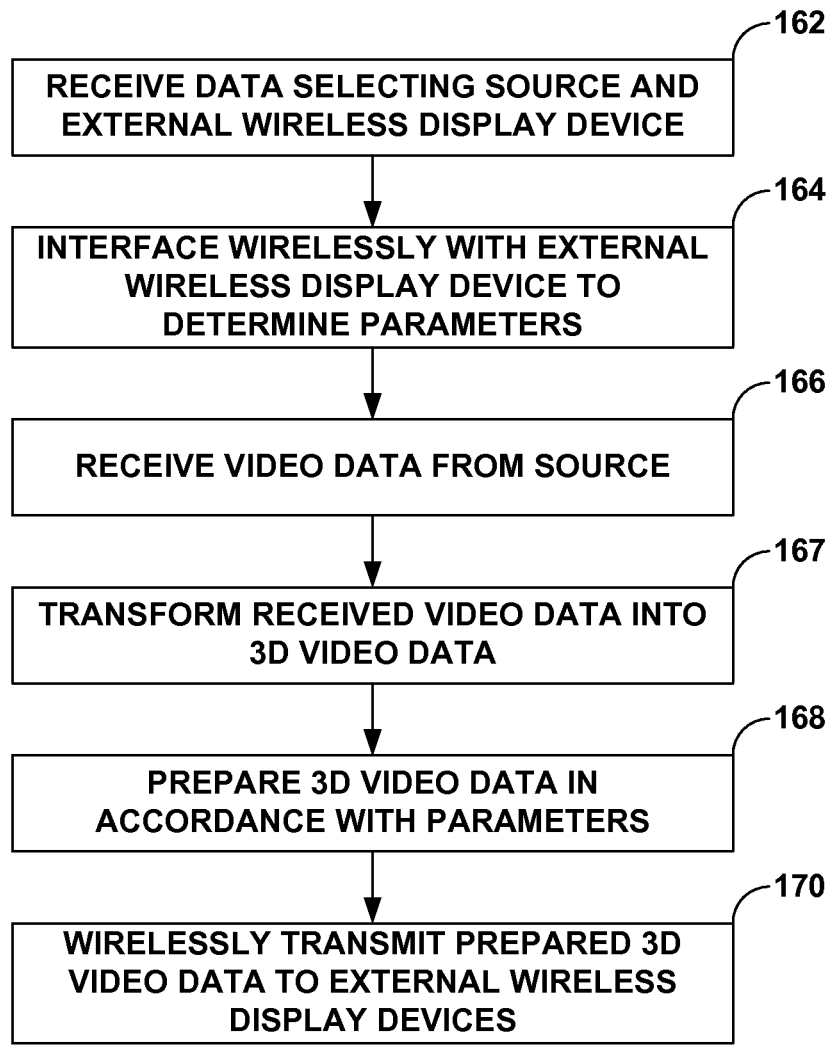
FIG. 6 is a flowchart illustrating example operation of a mobile device in performing various aspect of the techniques described in this disclosure.

FIG. 6 is a flowchart illustrating example operation of a mobile device, such as mobile device 128 shown in the example of FIG. 5, in performing various aspect of the techniques described in this disclosure. Initially, a user or other operator of mobile device 128 may interact with a user interface presented by user interface module 74 to input data selecting one or more sources of video content and one or more of external display devices 154 that supports wireless video content delivery (which may be referred to as an "external wireless display device"). User interface module 74 therefore receives data selecting the one or more sources and one or more of external wireless display devices 154 (162). User interface module 74 forwards the selection of one or more selected of external wireless display devices 154 to WD host unit 140.

WD host unit 140 then interfaces with the selected ones of external wireless display devices 154 via a wireless display interface, such as wireless display interface 144, to determine parameters that define one or more capabilities of the selected ones of external wireless display devices 154 (164). These parameters may be similar to parameters 76 discovered by parameter discovery module 38. One example parameter may include a wireless input file format supported by the selected ones of external wireless display devices 154.

Meanwhile, image/video processing unit 132 may receive video data 130 from one or more of the selected sources 32A, 32B, 50 and 52 (166). In terms of source 50 (which is shown in FIG. 5 as "video capture device 50"), video capture device 50 may comprise a stereo camera with two image sensors that simultaneously capture images incident on the two sensors at the same time to provide two viewpoints for a given image (or series of images in the case of video capture).

Video capture device 50 may capture video data in a synchronous manner in a number of ways. In a first way, data originating from the two sensors is received over the same memory bus using either of fast serial capture or parallel capture with buffers. In the case of serial capture, image/video processing unit 132 takes into account a time offset between the serial capture of two different views during depth extraction. In a second way, data originating from the two sensors is received over different memory buses to avoid complications arising when a single bus is shared between the two sensors. In a third way, data originating from the two sensors is typically in a streaming format and is written to display buffers to be previewed on embedded or external displays.

In this preview mode, typically only one of the two 2D viewpoints or, in other words, data streams from one of the two sensors may be previewed to conserve memory bandwidth and/or power. User preferences input via user interface module 74 may indicate whether 2D or 3D (e.g., one or both viewpoints are sent to the display processor). User input may be entered in real-time or near real-time for a given video recording or image capture session or may be specified as a general preference. User preference may also indicate whether to present data in 2D or 3D based on a given application, such that, as described above, 2D is used for text, email and web browsing and 3D is used for camcorder and media player. Image/video processing unit 132 may determine whether to transform video data 130 into 2D or 3D video data based on an available battery power or power management setting (with or without user input/intervention, which may be referred to as occurring "automatically").

In the case of 3D preview where internal display 140 presents preview video data 150 in 3D, display processing unit 138 may receive raw (uncompressed) 3D or image data for both viewpoints as two separate streams, e.g., preview video data 150A and 150B. Display processing unit 138 may also receive 2D video data 130 directly from the sensor and 3D depth information from image/video processing unit 132, image/video encoder unit 134 or from the 3D coded image/video file. Display processing unit 138 may also receive compressed 3D data from the 3D encoded image/video file (e.g., stored to local storage module 52) which may be streamed over a wired or wireless interface 32A, 32B to one of external display devices 154. In this case, if display mirroring is enabled, internal display 140 may obtain uncompressed but processed video streams from the sensors/signal processor. Optionally, internal display 140 may only render 2D image, e.g., one of preview video data 150. Display processing unit 138 may also receive 2D data from a single sensor of video capture device 50, where image/video processing unit 132 may comprise 2D-to-3D processing module similar to 2D-to-3D transformation module 58 of transformation module 36 shown in FIG. 2 that converts the 2D data into 3D data.

In any event, image/video processing unit 132 may transform the received video data 130 into 3D video data or otherwise refine 3D video data to generate 3D video data 146 and potentially preview video data 150 (167). Image/video processing unit 132 then forwards this data to 3D image/video encoder, which encodes 3D video data 146 to output encoded 3D video data 148. Image/video buffer unit 136 buffers or otherwise stores encoded 3D video data 148, and display processing unit 138 retrieves buffered video data 152 from image/video buffer unit 136 for formatting in accordance with an input file format. Display processing unit 138, as noted above, may also receive preview video data 150 and format this video data for display on internal display 140 simultaneous to the formatting of buffered 3D video data 152.

However, given that display processing unit 138 may not support wireless 3D file formats for delivering 3D video data 152 to the selected ones of external wireless displays 154, display processing unit 138 forwards data 152 to WD host unit 142. WD host unit 142 then prepares 3D video data 152 in accordance with the determined parameters in the manner described above (168). In particular, WD host unit 142 may format 3D video data 152 in accordance with a wireless 3D file format supported by one or more of the selected ones of external wireless display devices 154.

WD host unit 142 then forwards prepared 3D video data back to display processing unit 138 which forwards this prepared 3D video data (which may also be referred to as "3D video content 156") to wireless display interface 144. Wireless display interface 144 interfaces with the selected one or more of external wireless display devices 154 to wirelessly transmit this prepared 3D video data 156 to these one or more of external wireless display devices 154 (170).

Alternatively, as noted above, WD host unit 142 may be integrated with wireless display interface 144, whereupon display processing unit 138 forwards, without performing any formatting, buffered 3D video data 152 to wireless display interface 144. WD host unit 142, in this instance, formats buffered 3D video data 152 in accordance with the determined wireless file formats supported by the selected ones of externals wireless display devices 154. Wireless display interface 144 then forwards this prepared 3D video data 156 to the selected ones of external wireless display devices 154.

Figure 7:
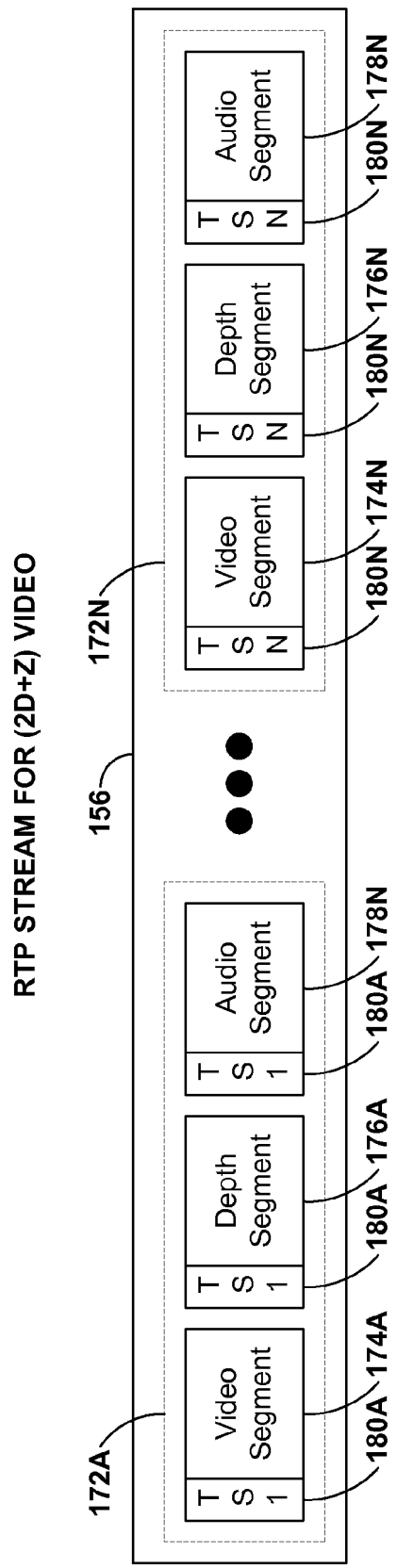
FIG. 7 is a block diagram illustrating three-dimensional (3D) video content that has been formatted in accordance with various aspect of the techniques described in this disclosure.

FIG. 7 is a block diagram illustrating 3D video content, such as 3D video content 156 shown with respect to the example of FIG. 5, that has been formatted in accordance with various aspect of the techniques described in this disclosure. In particular, transport unit 158 of WD host unit 142 has formatted 3D video content 156 in accordance with RTP. Transport unit 158 receives buffered 3D video data 152, which comprises a number of different portions 172A-172N ("portions 172"). These portions may comprise a portion of buffered 3D video data 152 and may correspond to a frame, a slice, a group of pictures, one or more macroblocks, one or more blocks, one or more pixel values or any other portion, whether defined (such as by headers or other notation) or undefined, of data 152. While not shown, buffer unit 136 may also buffer audio data, which may be forwarded along with buffered video data 152.

Each of portions 172 may comprise various segments of buffered video data 152, including both a video segment 174A-174N ("video segments 174") and depth segments 176A-176N ("depth segments 176"), and segments 178A-178N of buffered audio data ("audio segments 178"). Transport unit 158 assigns each of these portions 172 a corresponding time stamp 180A-180N ("time stamps 180"), which are shown in the example of FIG. 7 as "TS 1" through "TS N." Transport unit 158 then encapsulates each of segments 174, 176 and 178 with a corresponding one of time stamps 180 that was assigned to the corresponding one of portions 172 in which each of segments 174-178 resides.

For example, transport unit 158 assigns a time stamp 180A of "TS 1" to portion 172A in which segments 174A-178A reside. Transport unit 158 then encapsulates each of segments 174A, 176A and 178A with a time stamp 180A of "TS 1," resulting in the encapsulated segments shown in the example of FIG. 7. This encapsulation may conform to RTP. Transport unit 158 may also encapsulate each of segments 174-178 with other header information in accordance with RTP to form packets containing a different one of segments 174-178, as well as, generate and embed the above described metadata in the header of each of these packets, which is described in more detail below with respect to FIG. 8.

More information regarding RTP and the forming of packets in accordance with RTP can be found in request for comments (RFC) 2250, entitled "RTP Payload Format for MPEG1/MPEG2 Video," dated January 1998, RFC 2736, entitled "Guidelines for Writers of RTP Payload Format Specification," dated December 1999, RFC 3016, entitled "RTP Payload Format for MPEG-4 Audio/Visual Streams," dated November 2000, RFC 3550, entitled "RTP: A transport Protocol for Real-Time Applications," dated July 2003, RFC 3640, entitled "RTP Payload Format for Transport of MPEG-4 Elementary Streams," dated November 2003, RFC 3984, entitled "RTP Payload Format for H.264 Video," dated February 2005, and RFC 5691, entitled "RTP Payload Format for Elementary Streams with MPEG Surround Multi-Channel Audio, dated October 2009, each of which are hereby incorporated by reference in their entirety.

Leveraging RTP in this manner to produce 3D video content 156 formatted as an RTP stream may facilitate backwards compatibility in the sense that a 2D-only display device may receive this 3D video content 156 and present only video segments 174 without regard for depth segments 176. That is, this 2D-only display device may drop or otherwise not recognize depth segments 176 and only present the 2D video data sent as video segments 174. In this respect, the foregoing file format that leverages the extensibility of RTP to deliver depth segments 176 that are backwards compatible with respect to 2D-only display devices may promote cross-platform 3D video playback by virtue of this backward compatibility.

Figure 8A:
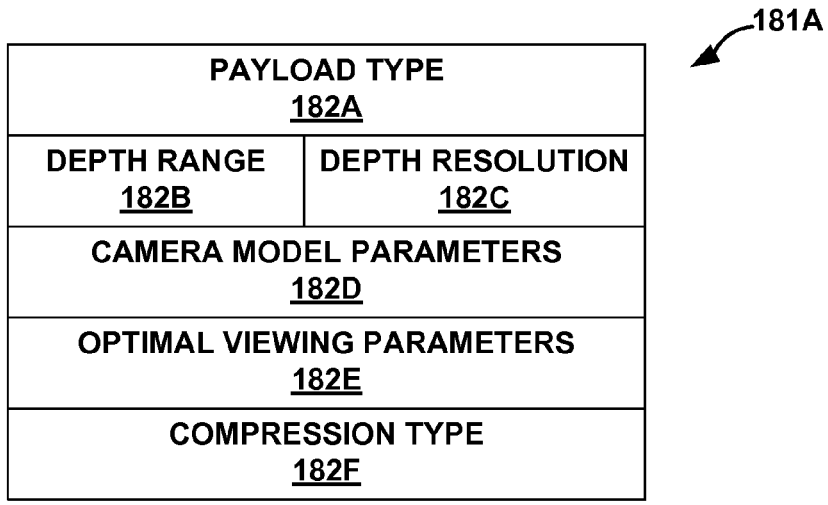
FIGS. 8A-8C are block diagrams illustrating example segments in which metadata has been embedded in accordance with various aspects of the techniques described in this disclosure.
Figure 8B:
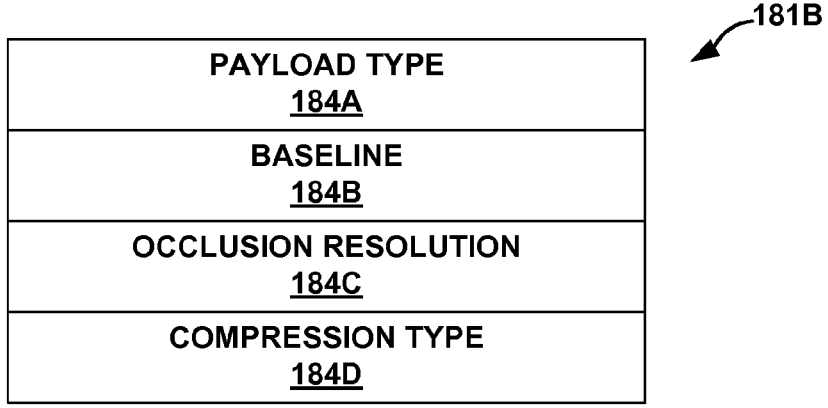
Figure 8C:
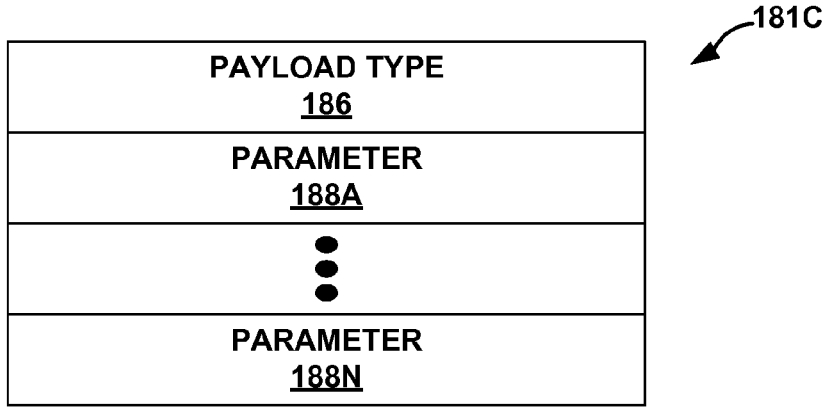

FIGS. 8A-8C are block diagram illustrating example segments 181A-181C in which metadata has been embedded in accordance with various aspects of the techniques described in this disclosure. FIG. 8A is a block diagram illustrating an example segment 181A that stores depth metadata in accordance with various aspects of the techniques described in this disclosure. Segment 181A includes a payload type field 182A ("payload type 182A"), a depth range field 182B ("depth range 182B"), a depth resolution field 182C ("depth resolution 182C"), a camera model parameters field 182D ("camera model parameters 182D"), an optimal viewing parameters field 182E ("optimal viewing parameters 182E") and a compression type field 182F ("compression type 182F").

Payload type field 182A stores the type of data, which in this example indicates depth data, stored to the segment, which may also be referred to as a "payload" to distinguish this data from header data encapsulating the payload. Depth range field 182B stores data directed to a width and size of a depth plane for a given 3D video image or video. The depth plane can be the same size or smaller than the current image. Camera model parameters field 182D stores data related to extrinsic and intrinsic camera model parameters. Optimal viewing parameters field 182E stores data directed to a viewing angle, which is defined by a size of the viewing screen and a viewing distance, as well as, a convergence plane, the above noted depth range, brightness and a number of other related parameters. Compression type field 182F stores data describing a type of compression used in the payloads of the video or audio segments, which may indicate JPEG, H.264 or a proprietary compression algorithm.

FIG. 8B is a block diagram illustrating an example segment 181B that stores occlusion metadata in accordance with various aspects of the techniques described in this disclosure. Segment 181B includes a payload type field 184A ("payload type 184A"), a baseline field 184B ("baseline 184B"), an occlusion resolution field 184C ("occlusion resolution 184C") and a compression type field 182D ("compression type 182D"). Payload type field 184A stores the type of data, which in this example indicates occlusion data, stored to the segment, which may also be referred to as a "payload" to distinguish this data from header data encapsulating the payload. Baseline field 184B stores data defining horizontal distance shifted with respect to the location of the first view from which the current image has been acquired. Occlusion resolution field 184C stored data defining a width and size of an occlusion plane, which can be the same size or smaller than the current image. Compression type 184D may be substantially similar to compression type 182F.

FIG. 8C is a block diagram illustrating an example segment 181C that stores global effects metadata in accordance with various aspects of the techniques described in this disclosure. Segment 181C includes a payload type field 186 ("payload type 186") and a plurality of parameters 188A-188N ("parameters 188"). Payload type field 184A stores the type of data, which in this example indicates global effects data, stored to the segment, which may also be referred to as a "payload" to distinguish this data from header data encapsulating the payload. Parameters 188 stored data corresponding to global effects, such as haze, rain, snow, and smoke. Each of parameters 188 may relate to a different type of global effect and specify the type, density, location and repetition of a given global effect. Parameters 188 may store this information to define global effects in a manner similar to the way such global effects are described in computer graphics.

Figure 9:
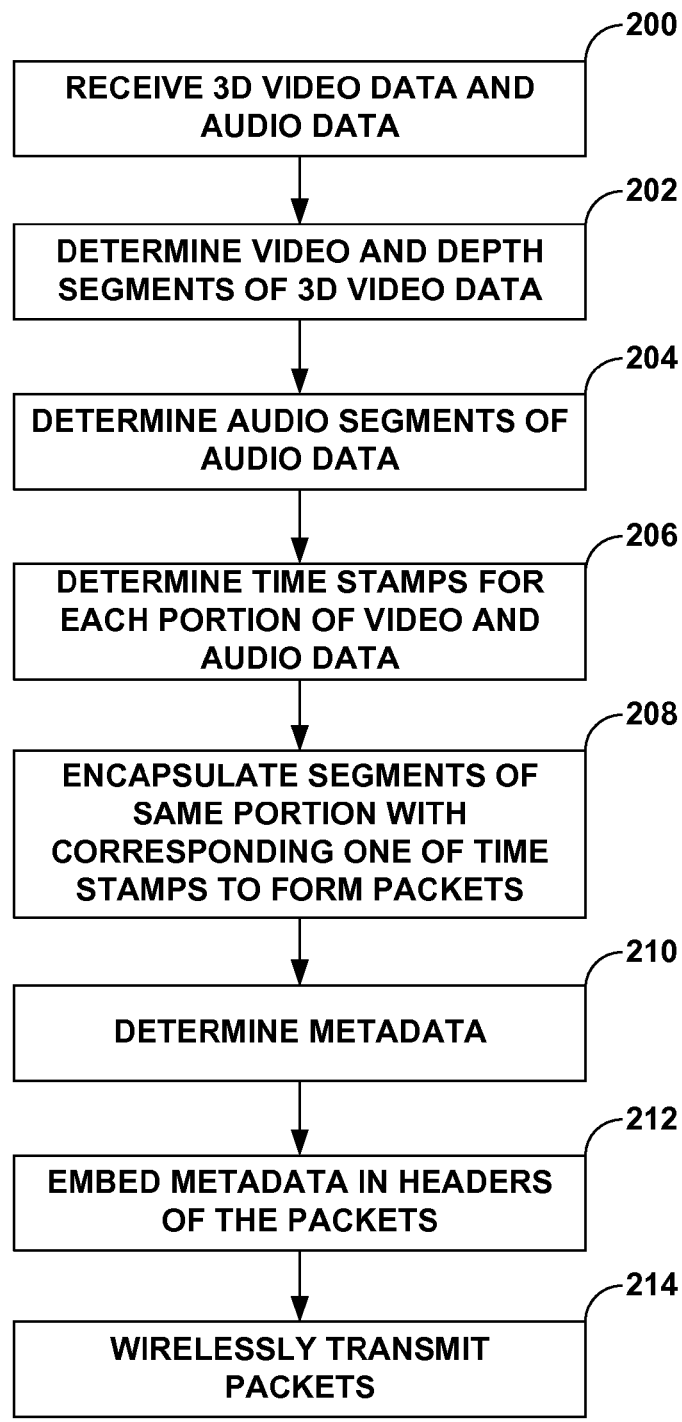
FIG. 9 is a flowchart illustrating example operation of a wireless display (WD) host unit in performing the formatting aspects of the techniques described in this disclosure.

FIG. 9 is a flowchart illustrating example operation of a wireless display (WD) host unit, WD host unit 142 shown in the example of FIG. 5, in performing the formatting aspects of the techniques described in this disclosure. Initially, WD host unit 142 may receive buffered 3D video data 152 and audio data from display processing unit 138 (200). Upon receiving 3D video data, transport unit 158 of WD host unit 142 determines video and depth segments of 3D video data 202, such as video and depth segments 174 and 176 of the example of FIG. 7 (202). Likewise, transport unit 158 determines audio segments of the audio data, such as audio segments 180 (204).

Transport unit 158 then determines time stamps 180 for each of portions 172 of video data 152 and audio data, as described above (206). Transport unit 158 encapsulates segments 174-178 of the same one of portions 172 with the corresponding one of time stamps 180 to form packets, also as described above (208). WD host unit 142 may determine metadata in the manner described above, whereupon transport unit 158 embeds the determined metadata in headers of the packets (210, 212). The resulting packets with the embedded metadata may resemble the packets shown in the example of FIG. 8. After embedding the metadata, transport unit 158 forwards the packets to wireless device interface 144, which proceeds to forward the packets to the selected ones of external wireless display devices 154 (214).

Figure 10A:
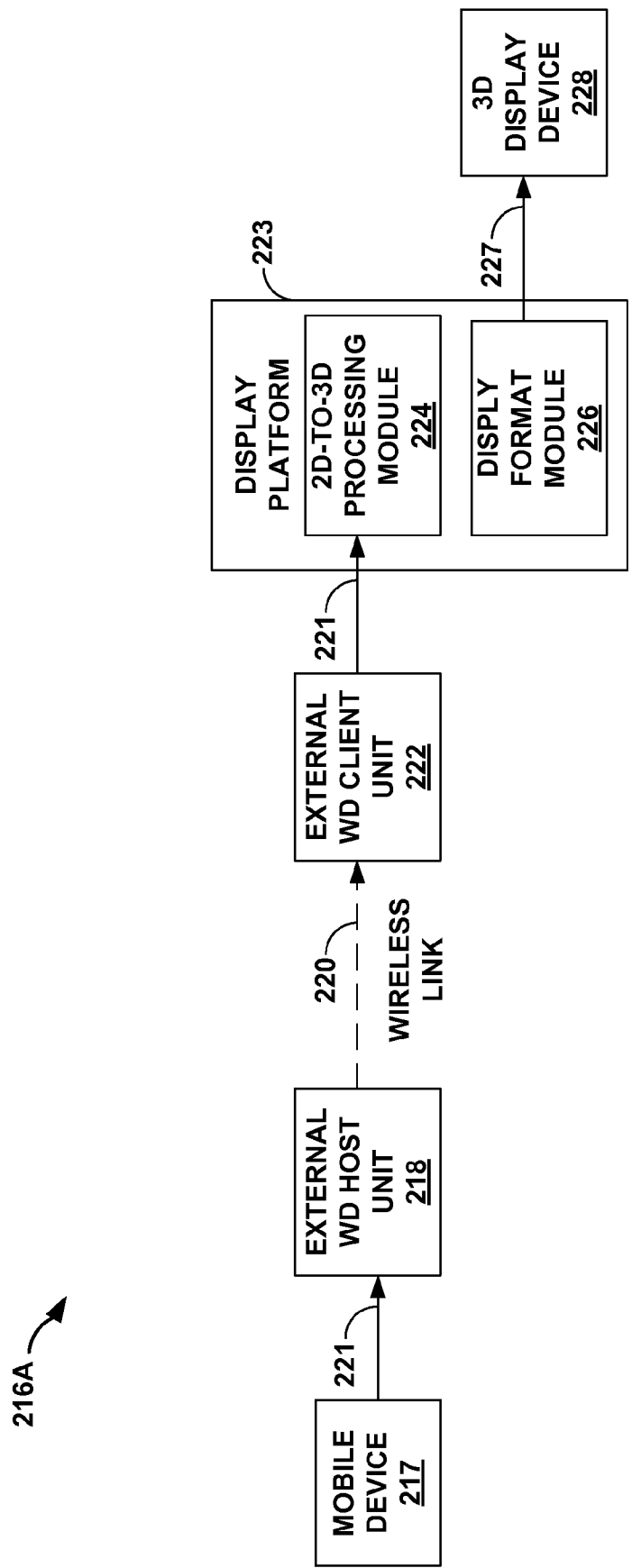
FIGS. 10A-10E are block diagrams illustrating various systems that implement one or more aspects of the techniques described in this disclosure to promote cross-platform video playback.

FIGS. 10A-10E are block diagrams illustrating various systems 216A-216E that implement one or more aspects of the techniques described in this disclosure to promote cross-platform video playback. More specifically, FIG. 10A is a block diagram illustrating a system 216A that includes an external WD host unit 218 and an external WD client unit 222, both of which implement various aspects of the techniques described in this disclosure. External WD host unit 218 may comprise a device that interfaces with a mobile device 217 of system 216A. Mobile device 217 may be similar to mobile device 128 of FIG. 5 except that mobile device 217 does not include an integrated or internal WD host unit similar to WD host unit 142 of mobile device 128. External WD host unit 218 may comprise a so-called "dongle" that interfaces with mobile device 217 through a wired interface similar to one of wired interfaces 32B of mobile device 128. For example, external WD host unit 218 may interface with mobile device 217 via a universal system bus (USB) or micro-USB wired interface.

External WD client unit 222 likewise comprises a device that interfaces with a display platform 223 of system 216A. External WD client 222, similar to external WD host unit 218, may comprise a so-called "dongle" that interfaces with display platform 223 via a wired interface, such as a USB interface, a composite audio/video (A/V) interface, an HDMI interface or any other wired interface.

Display platform 223 may represent a device that interfaces with a 3D display device 228 of system 216A, such as a digital video disc (DVD) player, an audio/video receiver, a Bluray™ disc player, a multimedia player, a digital video recorder (DVR), or any other device that provides a platform for interfacing with a 3D display device 228. In some instances, display platform 223 may comprise a personal computer, such as a laptop or desktop computer, or a device dedicated to performing 2D-to-3D conversion. 3D display device 228 may be similar to external display devices 154 shown in the example of FIG. 5. While shown as separate from 3D display device 228, display platform 223 may be integrated into 3D display device 228.

As noted above, there, as of yet, has not been any standardized wireless display protocol by which to forward video data wirelessly to display devices. Given this lack of standardized wireless display protocol, most display platforms, such as display platforms 223 do not support wireless video data receipt or transmission. Use of external WD host unit 218 and external WD client unit 222 may overcome this limitation.

To illustrate, consider that mobile device 217 may source 2D video data 221, which external WD host unit 218 may receive through the wired connection between mobile device 217 and external WD host unit 218 noted above. External WD host unit 218 may establish a wireless link 220 with external WD client unit 222 and then establish a session over wireless link 220. This session may comprise an RTP session. As external WD host unit 218 receives 2D video data 221, WD host unit 218 formats 2D video data 221 in accordance with a wireless display protocol supported by external WD client unit 222. For example, WD host unit 218 may prepare 2D video data 218 by formatting 2D video data 221 in accordance with the file format shown in the example of FIG. 7, except that 2D video data 221 would not include any depth segments and therefore the resulting formatted data would not include any depth packets leaving each portion to only have video and audio segments.

External WD host unit 218 may also interface with external WD client unit 222 to determine parameters defining the capabilities of display platform 223 and/or 3D display device 228. External WD host unit 218 may interface with external WD client unit 222 to request these parameters. In response to this request, external WD client unit 222 may interface with display platform 223 via the wired interface to discover capabilities of display platform 223 in the manner described above (e.g., using WHDMI). Display platform 223 may also have discovered parameters of 3D display device 228 when interfacing with 3D display device 228 using, for example, HDMI. Display platform 223 may then return parameters describing the capabilities of one or both of display platform 223 and 3D display device 228, which external WD client unit 222 forwards to external WD host unit 218. External WD host unit 218 may then generate metadata based on these parameter and embed this metadata into the headers of the various packets as described above.

In any event, WD host unit 218 transmits formatted 2D video data 221 to external WD client unit 222 via wireless link 220. Upon receiving this formatted 2D video data 221, external WD client unit 222 may decapsulate the various segments to reform 2D video data 221, as well as, extract the metadata embedded in the packet headers. External WD client unit 22 then forwards reformed 2D video data 221 to display platform 223 along with the metadata.

As shown in the example of FIG. 10A, display platform 223 includes a 2D-to-3D processing module 224 and a display format module 226, which may be similar to 2D-to-3D processing module 58 and display format module 64 of FIG. 2. While similar, 2D-to-3D processing module 224 and display format module 64 may be of a more limited nature in that 2D-to-3D processing module 224 may only support generation of certain 3D video data (e.g., depth as opposed to another view) and display format module 226 may only support a specific device specific 3D input file format (e.g., 2D-plus-Z as opposed to a multi-view stream). Despite the more limited nature of both of 2D-to-3D processing module 224 and display format module 226, both of modules 224 and 226 may be configurable to a certain extent and may utilize the forwarded metadata to improve generation of 3D video content 227 from the received 2D video data 221. 3D display device 228 receives and presents 3D video content 227.

2D-to-3D processing module 224 may comprise, as one example, a plug-in or other software module for either a hardware- or software-based media player. Display format module 226 may also comprise, in one example, a plug-in or other software module for either a hardware- or software-based media player. Display format module 226 may perform display format interleaving, which may be necessary for multi-view displays.

As described above, 2D-to-3D processing module 224 converts 2D video data 221 into the 3D video data of 3D video content 227 by extracting depth information. This depth extraction may involve identifying and segmenting large and small scale features from one or more frames of 2D video data 221. The depth extraction also involves classifying 2D video data 221 into regions, such as a background region, occluded regions, and foreground regions. Once classified, the depth extraction identifies a position and location of moving objects in a 3D model based on structure and motion in 2D video data 221. The result of the depth extraction is a depth value for each pixel in the 2D images (or frames) of 2D video data 221, which is stored as an N-bit bitmap image for each frame. Alternatively, a depth map may be generated for each region and the scene is composed on the fly during rendering.

In the case of stereoscopic displays that take as input 2D-plus-depth formatted 3D video content 227, the information in the depth map and 2D video data 221 are formatted to the 2D-plus-z file format to be input to 3D display device 228. If the display input file format for 3D display device 228 is a multiple streams file format, where multiple streams or views of video are encapsulated in a single container, 2D-to-3D processing module 224 may generate one or more additional secondary viewpoints corresponding to the 2D video data 221 based on 2D video frames and associated depth maps. Display format module 226 then interleaves the original 2D video data, or 2D video data 221, with the secondary views depending on the required viewing angle, number of views and other parameters defined for the display or by the user (e.g., as metadata).

Figure 10B:
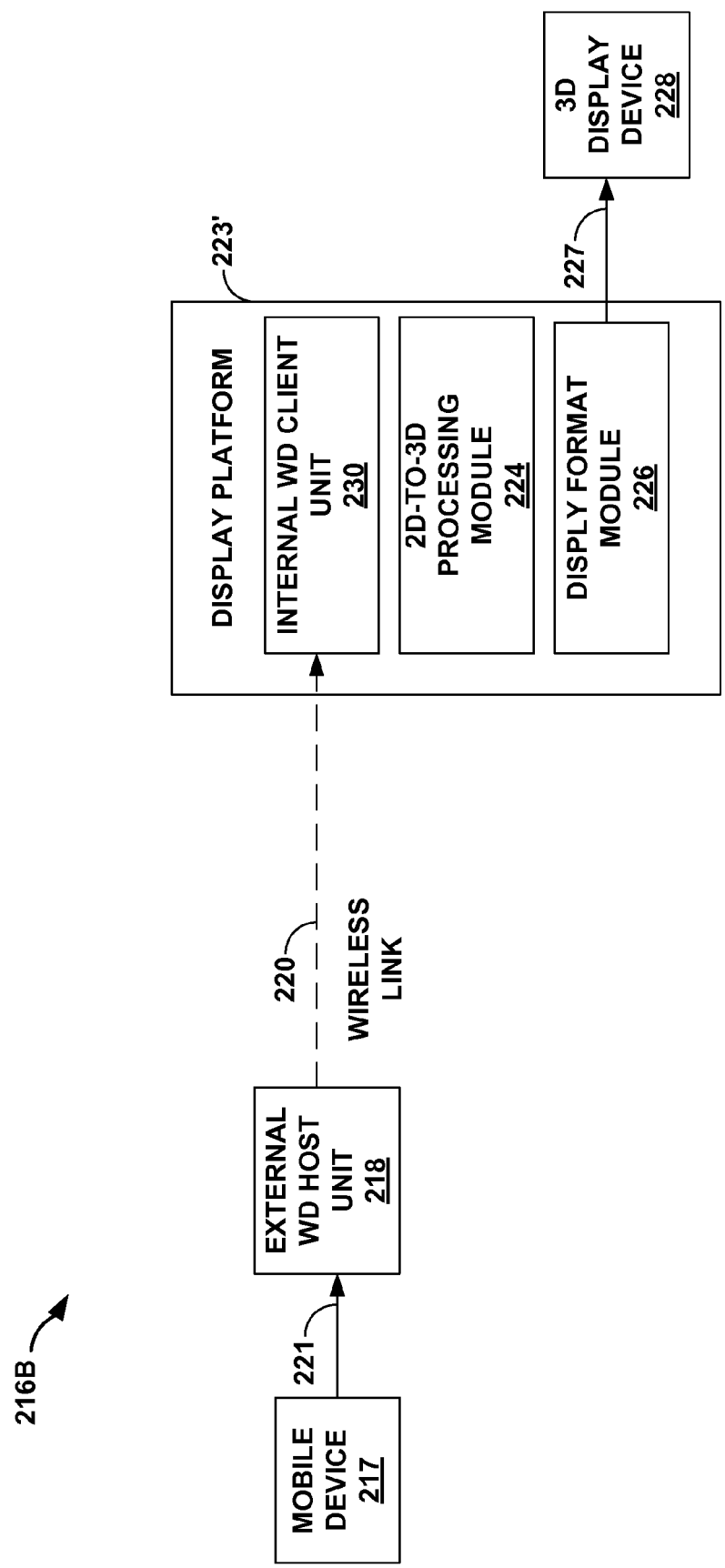

FIG. 10B is a block diagram illustrating a system 216B that includes an external WD host unit 218 and an internal WD client unit 230, both of which implement various aspects of the techniques described in this disclosure. System 216B is substantially similar to system 216A except that display platform 223' includes internal WD client unit 230 rather than interface with external WD client device as is the case in FIG. 10A, where display platform 223 interfaces with external WD client unit 222. For this reason, display platform 223' is denoted with a prime next to the reference numeral "223." Internal WD client unit 230 may operate in a manner substantially similar to external WD client unit 222, except for interfacing with display platform 223' via a wired interface. Instead, internal WD client device 230 is integrated within display platform 223' and thereby avoids externally interfacing with display platform 223'.

Figure 10C:
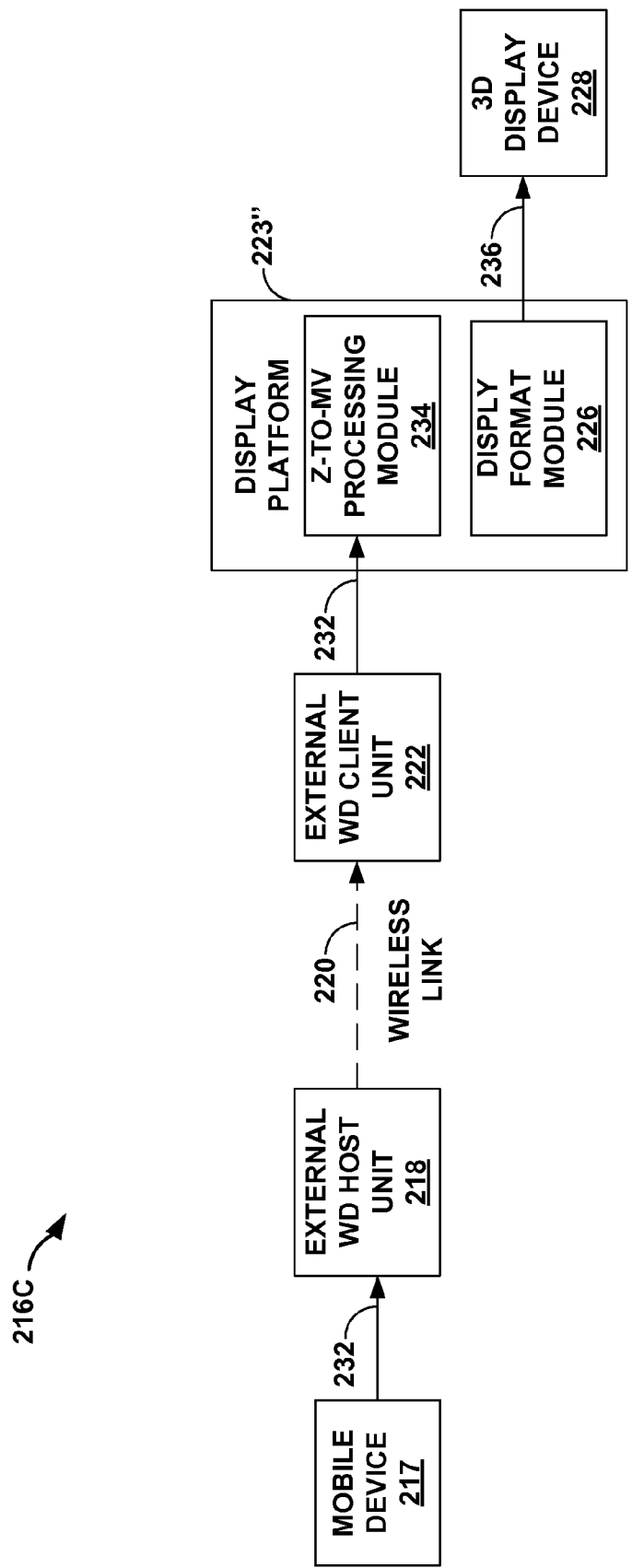

FIG. 10C is a block diagram illustrating another system 216C that includes external WD host unit 218 and external WD client unit 222, both of which implement various aspects of the techniques described in this disclosure. System 216C is similar to system 216A, except that display platform 223" of system 216C includes a depth-to-multiview (Z-to-MV) processing module 234. To indicate this difference, display platform 223" is denoted with two primes following the reference number "223." Another difference between systems 216A and 216C is that mobile device 217 outputs 3D video data 232 formatted in accordance with the 2D-plus-z file format.

Mobile device 217 may receive 2D video data from any of the sources described above with and perform 2D-to-3D processing, either in non-real-time or real-time or near-real-time. Alternatively, mobile device 217 may receive 3D video content and transform 3D video content into the 2D-plus-z format (as specified in MPEG-C Part 3). Mobile device 217 may encapsulate this 3D video data 232 using existing file formats, such as MP4, that have been modified to carry an additional packet per frame for the depth map (or "z") information. The encapsulation header for the depth packet may be that specified for user data in the file format specification as an informative element. Using this informative element may enable backwards compatibility with 2D video displays. The depth packet in this MP4 wireless display protocol may be associated with the corresponding video packet through timing/sync information or, alternatively, through frame unique identification information for the video packets, such as a sequence numbers, may be used for the association as well.

In system 216C, external WD host unit 218 receives 3D video data 232 and formats this data 232 in accordance with a wireless display protocol resulting in formatted 3D video data 232 similar to that shown in FIG. 7. WD host unit 218 may intercept 3D video data 232 at a parser for the MP4 file and retrieve video, audio and depth packets. WD host unit 218 then re-encapsulates these packets with RTP headers to form RTP streams, which WD host unit 218 streams to external WD client device 222 over a real-time streaming protocol (RTSP). These streams may be formatted in accordance with the formatting described above with respect to the example of FIG. 7. In effect, WD host unit 218 modifies a transport protocol (e.g., RTP) to carry 2D-plus-z 3D video data 232.

External WD client unit 222 receives these streams via wireless link 220, decapsulates the streams to reform 3D video data 232 encoded in accordance with the 2D-plus-z encoding and forwards this 3D video data 232 to Z-to-MV processing module 234. Z-to-MV processing module 234 converts the 3D video data 232 from the 2D-plus-z encoding format to the multiview stream encoding format by rendering multiviews from 3D video data 232. Display format module 226 then interleaves these multiviews in the manner described above to generate 3D video content 236, which 3D display device 228 receives and presents for consumption by one or more viewers.

Figure 10D:
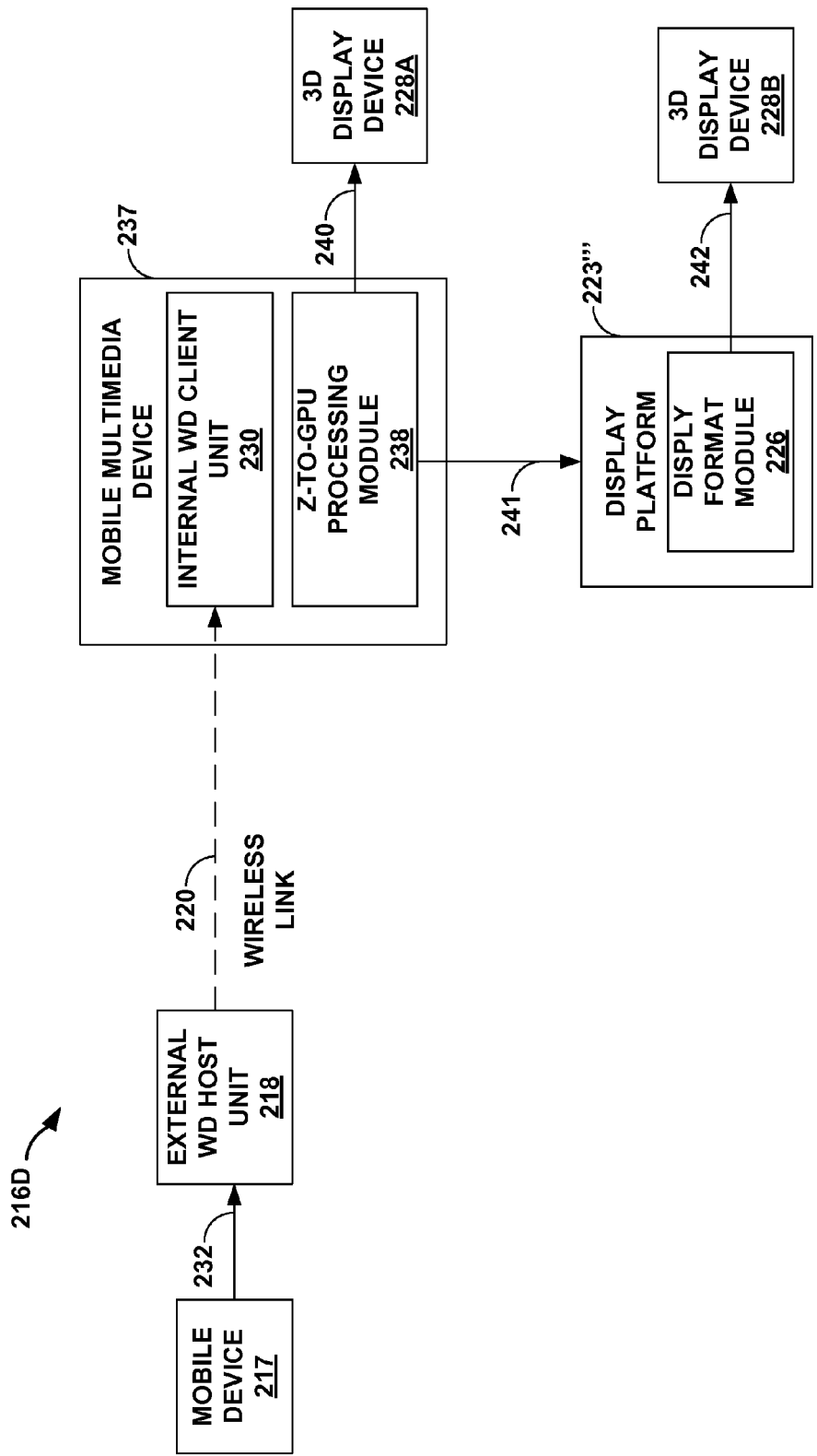

FIG. 10D is a block diagram illustrating another system 216D that includes an external WD host unit 218 and an internal WD client unit 230, both of which implement various aspects of the techniques described in this disclosure. As shown in FIG. 10D, system 216D is similar to system 216B in that both systems 216B, 21D include a mobile device 217, an external WD host unit 218, an internal WD client unit 230 and one or more 3D display devices 228. However, system 216D includes a mobile multimedia device 237 that includes internal WD client unit 230, whereas in system 216B, display platform 223' included internal WD client unit 230. For this reason, display platform 223 is denoted with three primes after the reference numeral "223" to identify this difference.

Mobile multimedia device 237 may include a mobile multimedia processor (not shown in FIG. 10D) that includes internal WD client unit 230 and a Z-to-graphics processing unit (GPU) processing module 238 ("Z-to-GPU processing module 238"). The multimedia processor may include a GPU. In this sense, WD client unit 230 and Z-to-GPU processing module 238 may be considered to be hosted on the multimedia processor with the GPU. Z-to-GPU processing module 238 performs depth to multiview conversion processes, so as to convert 3D video data 232 encoded in accordance with the 2D-plus-z format to a multiview encoding format. Internal WD client unit 230 and external WD host unit 218 may communicate with one another in the same manner as that described with respect to these same units in system 216B of FIG. 10B only that the communication involves 3D video data 232 as described with respect to system 216C of FIG. 10C.

In any event, internal WD client unit 230 receives encapsulated 3D video data 232 formatted in accordance with the wireless display protocol and decapsulates this encapsulated 3D video data 232 to reform 3D video data 232. Internal WD client unit 230 forwards this data 232 to Z-to-GPU processing module 238, which utilizes the GPU as a general purpose computing engine by which to perform the conversion processes to generate 3D video data 242 formatted in accordance with a multiview encoding format. Use of the GPU as a general purpose computing engine may involve using OpenCL, which comprises a framework for writing programs that execute across heterogeneous platforms consisting of CPUs and GPUs. OpenCL includes a language for writing functions that execute on OpenCL devices, plus application programmer interfaces (APIs) that are used to define and then control the platform.

Z-to-GPU processing module 238 may perform real-time or near-real-time depth-to-multiview conversion using the GPU and thereby may enable interfacing with heterogeneous displays that accept 3D content in different formats, such as 2D-plus-z formats and multistream video formats For example, Z-to-GPU processing module 238 may generate 3D video data 240 formatted in accordance with the 2D-plus-z format, which 3D display 228A may directly accept without intervening processing by display platform 223". Z-to-GPU processing module 238 may also generate 3D video data 241 formatted in accordance with the multiview format and forward this data 241 to display platform 223'". Display format module 226 of display platform 223'" may interleave the streams from multiview formatted 3D video data 241 to generate 3D video data 242, which 3D display device 228B may receive and present.

Figure 10E:
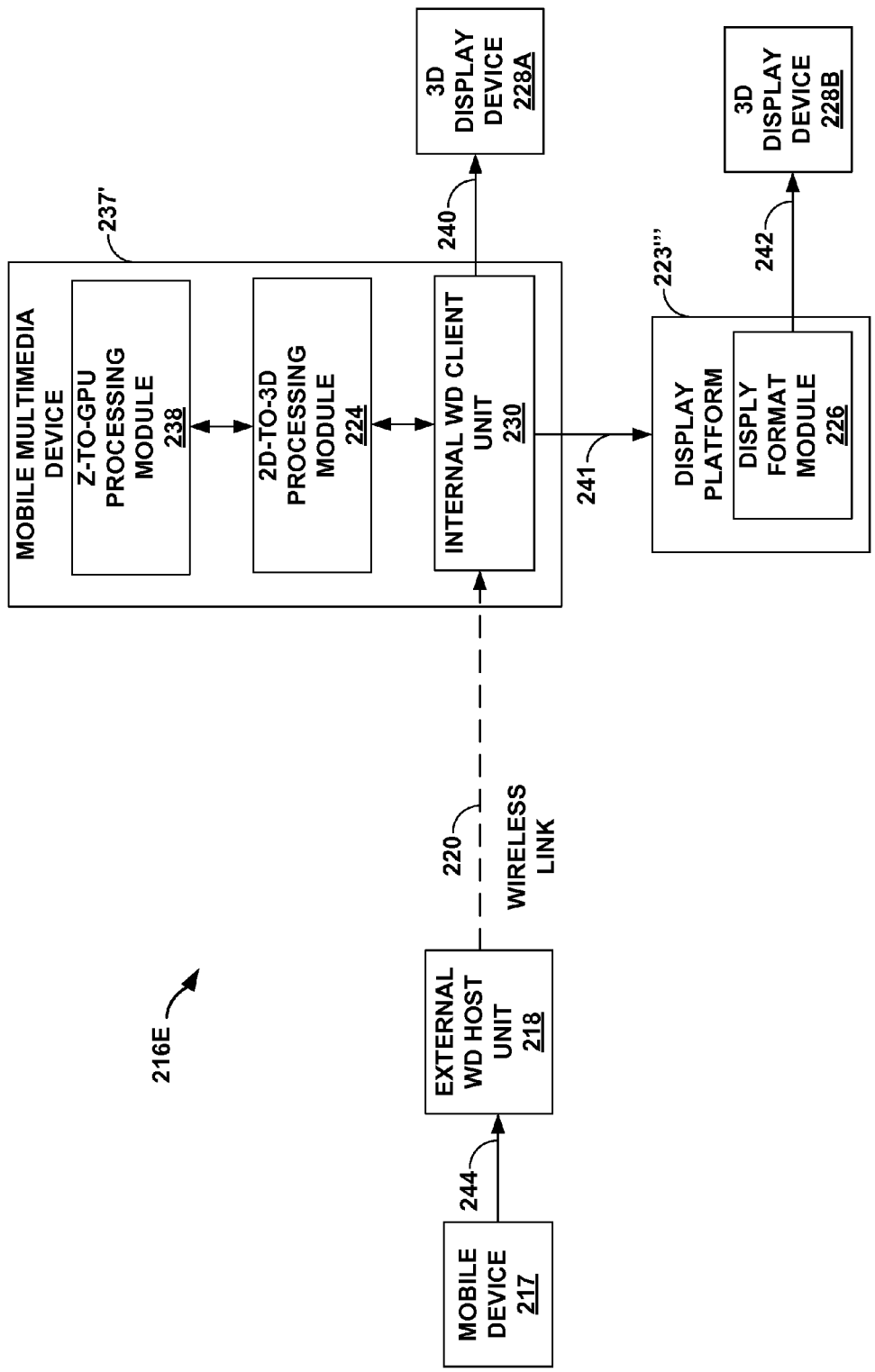

FIG. 10E is a block diagram illustrating another system 216E that performs one or more aspects of the techniques described in this disclosure. System 216E may be similar to system 216D of FIG. 10D, except that mobile multimedia device 237' includes internal WD client unit 230 and a 2D-to-3D processing module 224. To denote this difference, mobile multimedia device 237' includes a prime following the reference numeral "237."

In any event, mobile device 217 may forward either 2D video content or 3D video content 244 to external WD host unit 218, which encapsulates this content 244 according to the wireless display protocol in the manner described above and forwards formatted content 244 via wireless link 220 to internal WD client unit 230. If the content is 2D video content 244, internal WD client unit 230 may then forward this data 244 to 2D-to-3D processing unit 224 to perform real-time or near-real-time 2D-to-3D conversion (e.g., depth extraction). If required by one or both of displays 228A, 228B, 2D-to-3D processing module 224 may forward the 3D video data to Z-to-GPU processing module 238 to generate multiview formatted 3D video data, as described above. Alternatively, if internal WD client unit 230 receives 3D video content 244 and one or both of displays 228A, 228B require a multiview file format, internal WD client unit 230 may forward 3D video content 244 to Z-to-GPU processing module 238, which generates 3D video data 241 formatted in accordance with the multiview file format.

Mobile multimedia device 237' may then forward content 240 to 3D display device 228A as described above. Alternatively, mobile multimedia device 237' may forward 3D video data 241 to display platform 223''', as described above. Display platform 223''', again as described above, may interleave the multiple views using display format modules 226 and forward resulting 3D video content 242 to 3D display device 228B.

In system 216E, mobile device 217 may chose to drive 2D or 3D video content over the wireless display protocol implemented by external and internal WD host/client units 218, 230. As noted above, WD host unit 218 and WD client unit 230 may exchange parameters describing displays (one or more through mirroring) to which the client is connected, where these parameters include a 3D content format supported by these displays. Depending on the available bandwidth on wireless link 220, WD client unit 230 may perform the 2D-to-3D conversion process rather than mobile device 217. Performing the conversion within mobile multimedia device 237' may also promote a better user experience and visual quality. Moreover, depending on the parameters of the 3D display, the depth-to-multiview conversion process is executed. Additionally, mobile multimedia device 237' may perform format translation from the wireless display protocol to the display format.

In all of system 216A-216E, the various components may utilize WD host and client units to enable traditionally wired displays to become wireless displays or at least to become accessible via a wireless connection. Consequently, the various internal and external WD host and client units may promote cross-platform 3D video playback by converting wired displays onto wireless displays. Moreover, the various WD host and client units do not mandate a particular 3D content format but only provide for a wireless display transport protocol by which to efficiently transmit 3D video data wirelessly while still enabling backwards compatibility with 2D-only display devices. In this respect, the various internal and external WD host and client units may further promote cross-platform 3D video playback.

The techniques described herein may be implemented in hardware, firmware, or any combination thereof. The hardware may, in some instances, also execute software. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various examples of the disclosure have been described. These and other examples are within the scope of the following claims.

The invention claimed is:

1. A portable device comprising:
   a module to store video data;
   a wireless interface;
   a wireless display host module that:
      wirelessly communicates with a three-dimensional (3D) display device external from the portable device via the wireless interface using a wireless display protocol;
      determines one or more display parameters of the 3D display device based on the wireless communication with the 3D display device; and
      prepares the stored video data in accordance with the wireless display protocol to generate 3D video data based on the determined display parameters,
   a transformation module that transforms the video data to generate the 3D video data, wherein the wireless interface wirelessly transmits the 3D video data to the external 3D display device in accordance with the wireless display protocol;

a user interface module that presents a user interface that receives input data defining one or more user preferences; and a Human Visual System (HVS) feedback module that, while the transformation module transforms the video data, determines one or more metrics using a HVS model that reflect a quality of 3D visualization of the generated 3D video data with respect to a human visual system, wherein the metrics comprise metrics measuring visual discomfort based on the one or more user preferences, and wherein the HVS feedback module generates configuration data based on the one or more metrics and the defined user preferences, and reconfigures the transformation module based on the configuration data to refine the generation of the 3D video data so that the transformation module generates the 3D video data in accordance with the defined user preferences.

2. The portable device of claim 1, wherein the wireless display host module prepares the video data by at least in part by processing one or more of the video data and metadata associated with the video data in accordance with one or more of the display parameters.

3. The portable device of claim 1, wherein the stored video data comprises two-dimensional (2D) video data, wherein the wireless display host module automatically determines the display parameters, and wherein the display parameters include an input format supported by the 3D display device, and wherein the wireless display host module configures the transformation module so that the video processing module generates the 3D video data in accordance with the automatically determined input format.

4. The portable device of claim 1, wherein the wireless display protocol comprises a transport protocol that encapsulates each of a plurality of video data and a plurality of depth data segments of the 3D video data in a different one of a plurality of packets.

5. The portable device of claim 4, wherein the transport protocol comprises an application layer transport protocol, and wherein the application layer transport protocol comprises a real-time transport protocol (RTP).

6. The portable device of claim 4, wherein the transport protocol further encapsulates metadata associated with the depth data segments.

7. The portable device of claim 1, wherein the wireless interface wirelessly transmits the 3D video data to a wireless display client module coupled to the external 3D display device, and wherein the wireless display host module and the wireless display client module both support the wireless display protocol.

8. The portable device of claim 1, wherein the wireless display host module automatically determines the display parameters, and wherein the display parameters include an input format supported by the 3D display device, and wherein the wireless display host module configures the transformation module so that the transformation module generates the 3D video data in accordance with the automatically determined input format.

9. The portable device of claim 8, wherein the input format comprises one of a 2D-plus-depth input format a 2D-plus-depth-occlusion-and-global-effects input format, and a multiview stream input format, and wherein the 2D-plus-depth-occlusion-and-global-effects input format defines one or more of a transparency, a global illumination model and an atmospheric effect.

10. The portable device of claim 8, wherein the user interface module presents a user interface that receives input data selecting the 3D display device from among a plurality of 3D display devices, wherein the wireless interface wirelessly communicates with the selected 3D display device in accordance with the wireless display protocol to automatically determine the display parameters.

11. The portable device of claim 1, wherein the wireless interface transmits the 3D video data to the 3D display device as the 3D video data is generated.

12. The portable device of claim 1, wherein the portable device comprises one of a mobile cellular phone, a mobile computing device, a portable device and a handset device.

13. A method comprising:

storing, with a portable device, video data;

wirelessly communicating with a three-dimensional (3D) display device external from the portable device using a wireless display protocol;

determining, with a wireless display host module of the portable device, one or more display parameters of the 3D display device external from the portable device based on the wireless communication with the 3D display device;

preparing, with the wireless display host module, the video data in accordance with the wireless display protocol to generate 3D video data based on the determined display parameters;

transforming, with a transformation module, the video data to generate the 3D video data;

transmitting, with the portable device, the 3D video data to the external 3D display device in accordance with the wireless display protocol;

presenting a user interface that receives input data defining one or more user preferences;

while the transformation module transforms the video data, determining, with a Human Visual System (HVS) feedback module, one or more metrics using a HVS model that reflect a quality of 3D visualization of the generated 3D video data with respect to a human visual system, wherein the metrics comprise metrics measuring visual discomfort based on the one or more user preferences;

generating, with the HVS feedback module, configuration data based on the one or more metrics and the defined user preferences; and reconfiguring, with the HVS feedback module, the transformation module based on the configuration data to refine the generation of the 3D video data so that the transformation module generates the 3D video data in accordance with the defined user preferences.

14. The method of claim 13, wherein preparing the video data comprises processing one or more of the video data and metadata associated with the video data in accordance with one or more of the display parameters.

15. The method of claim 13, wherein the stored video data comprises two-dimensional (2D) video data, wherein determining the one or more display parameters comprises automatically determining the one or more display parameters, and wherein the display parameters include an input format supported by the 3D display device, and the method further comprises configuring the transformation module so that the video processing module generates the 3D video data in accordance with the automatically determined input format.

16. The method of claim 13, wherein the wireless display protocol comprises a transport protocol that encapsulates each of a plurality of video data and a plurality of depth data segments of the 3D video data in a different one of a plurality of packets.

17. The method of claim 16,
wherein the transport protocol comprises an application layer transport protocol, and
wherein the application layer transport protocol comprises a real-time transport protocol (RTP).

18. The method of claim 16, wherein the transport protocol further encapsulates metadata associated with the depth data segments.

19. The method of claim 13, wherein transmitting the 3D video data comprises wirelessly transmitting the 3D video data to a wireless display client module coupled to the external 3D display device, and wherein the wireless display host module and the wireless display client module both support the wireless display protocol.

20. The method of claim 13,
wherein determining the one or more display parameters comprises automatically determining the one or more display parameters, and
wherein the display parameters include an input format supported by the 3D display device, and
the method further comprising configuring the transformation module so that the transformation module generates the 3D video data in accordance with the automatically determined input format.

21. The method of claim 20, wherein the input format comprises one of a 2D-plus-depth input format, a 2D-plus-depth-occlusion-and-global-effects input format, and a multiview stream input format, and
wherein the 2D-plus-depth-occlusion-and-global-effects input format defines one or more of a transparency, a global illumination model and an atmospheric effect.

22. The method of claim 20, further comprising:
presenting a user interface that receives input data selecting the 3D display device from among a plurality of 3D display devices; and
wirelessly communicating with the selected 3D display device in accordance with the wireless display protocol to automatically determine the display parameters.

23. The method of claim 13, wherein transmitting the 3D video data comprises transmitting the 3D video data to the 3D display device as the 3D video data is generated.

24. The method of claim 13, wherein the portable device comprises one of a mobile cellular phone, a mobile computing device, a portable device and a handset device.

25. A portable device comprising:
means for storing video data;
means for wirelessly communicating with a three-dimensional (3D) display device external from the portable device using a wireless display protocol;
means for determining one or more display parameters of the 3D display device based on the wireless communication with the 3D display device;
means for preparing the stored video data in accordance with the wireless display protocol to generate 3D video data based on the determined display parameters;
means for transforming the video data to generate the 3D video data;
means for transmitting the 3D video data to the external 3D display device in accordance with the wireless display protocol;
means for presenting a user interface that receives input data defining one or more user preferences;
means for determining, while transforming the video data, one or more metrics using a Human Visual System (HVS) model that reflect a quality of 3D visualization of the generated 3D video data with respect to a human visual system, wherein the metrics comprise metrics measuring visual discomfort based on the one or more user preferences;
means for generating configuration data based on the one or more metrics and the defined user preferences; and
means for reconfiguring the means for transforming based on the configuration data to refine the generation of the 3D video data so as to generate the 3D video data in accordance with the defined user preferences.

26. The portable device of claim 25, wherein the means for preparing the video data comprises means for processing one or more of the video data and metadata associated with the video data in accordance with one or more of the display parameters.

27. The portable device of claim 25, wherein the stored video data comprises two-dimensional (2D) video data, wherein the means for transforming comprises means for transforming the 2D video data into the 3D video data,
wherein the means for determining the one or more display parameters comprises means for automatically determining the one or more display parameters, and
wherein the display parameters include an input format supported by the 3D display device, and
wherein the portable device further comprises means for configuring the means for preparing so that the means for preparing generates the 3D video data in accordance with the automatically determined input format.

28. The portable device of claim 25, wherein the wireless display protocol comprises a transport protocol that encapsulates each of a plurality of video data and a plurality of depth data segments of the 3D video data in a different one of a plurality of packets.

29. The portable device of claim 28,
wherein the transport protocol comprises an application layer transport protocol, and
wherein the application layer transport protocol comprises a real-time transport protocol (RTP).

30. The portable device of claim 28, wherein the transport protocol further encapsulates metadata associated with the depth data segments.

31. The portable device of claim 25, wherein the means for transmitting the 3D video data comprises means for wirelessly transmitting the 3D video data to a wireless display client module coupled to the external 3D display device, and wherein the wireless display host module and the wireless display client module both support the wireless display protocol.

32. The portable device of claim 25, further comprising:
wherein the means for determining the one or more display parameters comprises means for automatically determining the one or more display parameters, and
wherein the display parameters include an input format supported by the 3D display device; and
wherein the portable device further comprises means for configuring the means for preparing so that the means for preparing generates the 3D video data in accordance with the automatically determined input format.

33. The portable device of claim 32, wherein the input format comprises one of a 2D-plus-depth input format, a 2D-plus-depth-occlusion-and-global-effects input format, and a multiview stream input format, and wherein the 2D-plus-depth-occlusion-and-global-effects input format defines one or more of a transparency, a global illumination model and an atmospheric effect.

34. The portable device of claim 32, further comprising:

means for presenting a user interface that receives input data selecting the 3D display device from among a plurality of 3D display devices; and means for wirelessly communicating with the selected 3D display device in accordance with the wireless display protocol to automatically determine the display parameters.

35. The portable device of claim 25, wherein the means for transmitting the 3D video data comprises means for transmitting the 3D video data to the 3D display device as the 3D video data is generated.

36. The portable device of claim 25, wherein the portable device comprises one of a mobile cellular phone, a mobile computing device, a portable device and a handset device.

37. A non-transitory computer-readable storage medium comprising instructions that cause a processor to:

store video data;

wirelessly communicate with a three-dimensional (3D) display device external from a portable device via the wireless interface using a wireless display protocol;

determine one or more display parameters of the 3D display device based on the wireless communication with the 3D display device;

prepare the stored video data to generate 3D video data in accordance with the wireless display protocol based on the determined display parameters;

transform the video data to generate the 3D video data with a transformation module;

wirelessly transmit the 3D video data to the external 3D display device in accordance with the wireless display protocol;

present a user interface that receives input data defining one or more user preferences;

while the transforming the video data, determine one or more metrics using a Human Visual System (HVS) model that reflect a quality of 3D visualization of the generated 3D video data with respect to a human visual system, wherein the metrics comprise metrics measuring visual discomfort based on the one or more user preferences;

generate configuration data based on the one or more metrics and the defined user preferences; and reconfigure the transformation module based on the configuration data to refine the generation of the 3D video data so that the transformation module generates the 3D video data in accordance with the defined user preferences.

* * * * *